United States Patent
Kozaki

(10) Patent No.: US 9,605,681 B2
(45) Date of Patent: Mar. 28, 2017

(54) VACUUM PUMP

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

(*) Notice: Subject to any disclaimer, the term of this patent is extended or adjusted under 35 U.S.C. 154(b) by 389 days.

(21) Appl. No.: 14/197,409

(22) Filed: Mar. 5, 2014

(65) Prior Publication Data

US 2014/0271237 A1   Sep. 18, 2014

(30) Foreign Application Priority Data

Mar. 13, 2013   (JP) .............................. 2013-050831

(51) Int. Cl.
| | |
|---|---|
| *H02P 27/00* | (2006.01) |
| *F04D 19/04* | (2006.01) |
| *F04D 27/00* | (2006.01) |
| *F04D 27/02* | (2006.01) |
| *H02P 21/24* | (2016.01) |
| *H02P 21/18* | (2016.01) |

(52) U.S. Cl.
CPC ........... *F04D 19/042* (2013.01); *F04D 19/04* (2013.01); *F04D 27/001* (2013.01); *F04D 27/0261* (2013.01); *H02P 21/18* (2016.02); *H02P 21/24* (2016.02)

(58) Field of Classification Search
USPC .......... 318/599, 400.17, 400.26, 400.15, 801
See application file for complete search history.

(56) References Cited

U.S. PATENT DOCUMENTS

| | | | | |
|---|---|---|---|---|
| 5,608,310 A | * | 3/1997 | Watanabe ............. | H02J 7/1446 322/28 |
| 6,348,749 B1 | * | 2/2002 | Ueyama .............. | F16C 32/0442 310/90.5 |

(Continued)

FOREIGN PATENT DOCUMENTS

| | | | |
|---|---|---|---|
| JP | 404175466 A | * | 6/1992 |
| JP | 08-098582 A | | 4/1996 |

(Continued)

OTHER PUBLICATIONS

Chinese Office Action dated Apr. 5, 2106 for corresponding Chinese Application No. 201410083655.X.

(Continued)

*Primary Examiner* — Paul Ip
*Assistant Examiner* — Iftekhar Mustafa
(74) *Attorney, Agent, or Firm* — Renner, Otto, Boisselle & Sklar, LLP

(57) ABSTRACT

An estimating section detects a signal including counter electromotive voltage information of the motor, and estimating a magnetic pole electric angle and a rotational speed of the motor. A driving current controller repeats generation and cut-off of the driving current supplied from a power supply to the motor via the inverter circuit or regenerated from the motor to the power supply in a low-speed period between a stopped state and a predetermined rotational speed in an accelerating operation at a motor starting time or a decelerating operation at a motor stopping time. The estimating section detects the signal at the cut-off time so as to estimate the magnetic pole electric angle and the rotational speed in the low-speed period.

8 Claims, 24 Drawing Sheets

(56) References Cited

U.S. PATENT DOCUMENTS

| | | | |
|---|---|---|---|
| 7,342,378 B2 | 3/2008 | Sakamoto et al. | |
| 2004/0212333 A1* | 10/2004 | Ohtachi | H02P 6/10 318/400.15 |
| 2007/0069681 A1* | 3/2007 | Imura | H02P 6/182 318/717 |
| 2009/0193273 A1* | 7/2009 | Kobayashi | G06F 1/26 713/320 |
| 2009/0251082 A1 | 10/2009 | Kono et al. | |
| 2013/0155731 A1* | 6/2013 | Reichard | H02M 5/453 363/37 |
| 2013/0200832 A1* | 8/2013 | Oh | H02P 6/00 318/400.37 |
| 2014/0176032 A1* | 6/2014 | Lee | H02P 6/182 318/400.35 |

FOREIGN PATENT DOCUMENTS

| | | |
|---|---|---|
| JP | 08-256496 | 10/1996 |
| JP | 11-075394 A | 3/1999 |
| JP | 2007-151351 A | 6/2007 |
| JP | 4692891 | 3/2011 |
| JP | 2011101932 A * | 5/2011 |
| JP | 2011-231760 | 11/2011 |
| WO | WO 2008/065719 A1 | 6/2008 |

OTHER PUBLICATIONS

English translation of Japanese Office Action dated Sep. 20, 2016 for corresponding Japanese Application No. 2013-050831.
English translation of Chinese Office Action dated Nov. 14, 2016 for corresponding Chinese Application No. 201410083655.X.

* cited by examiner

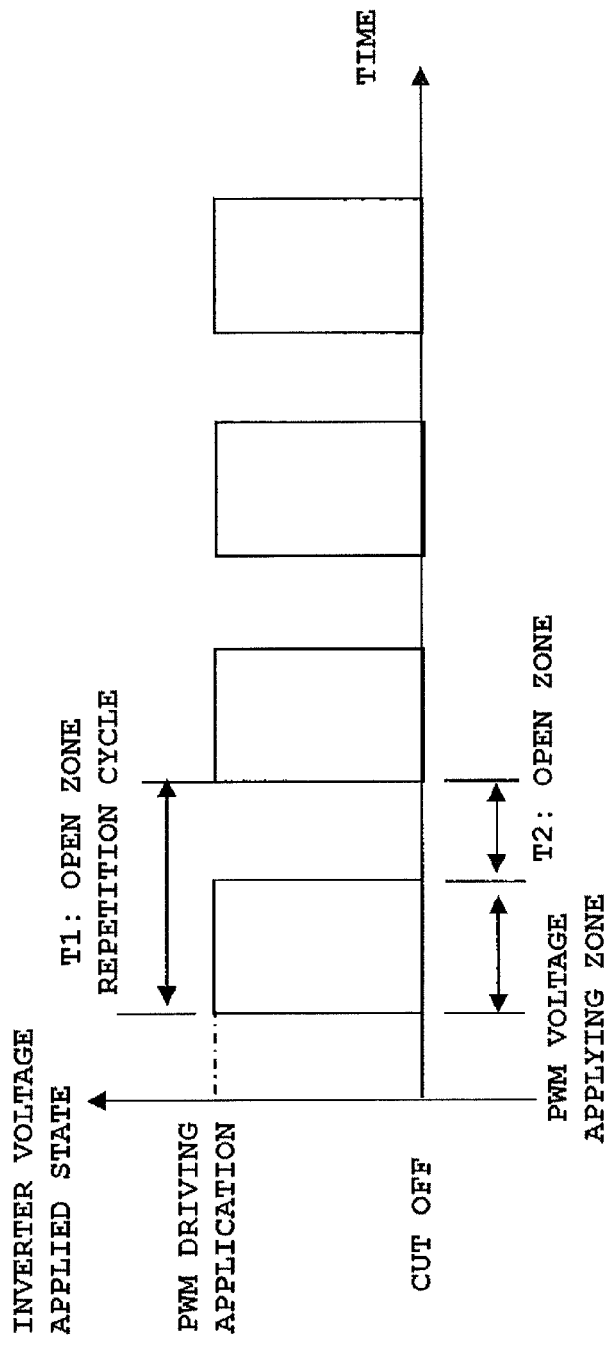
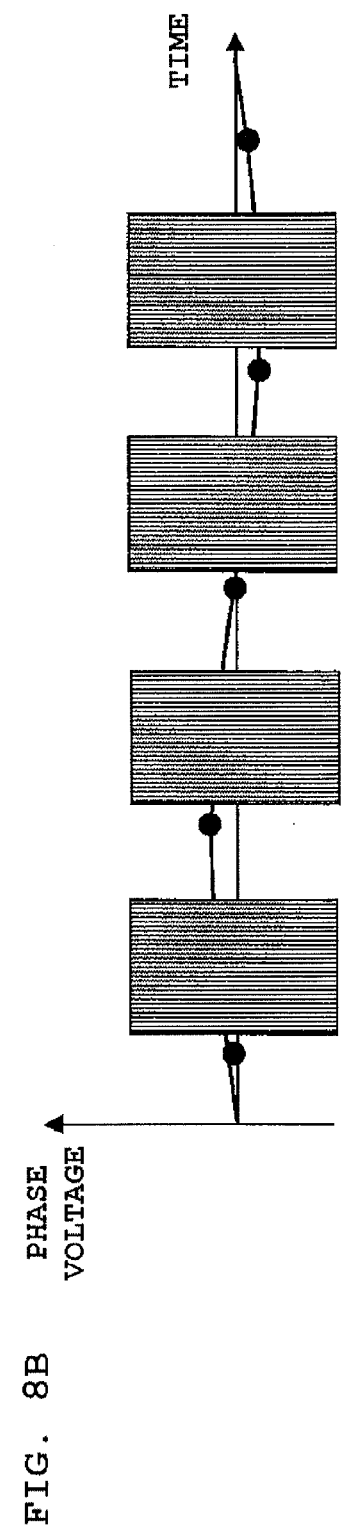
FIG. 8A
FIG. 8B

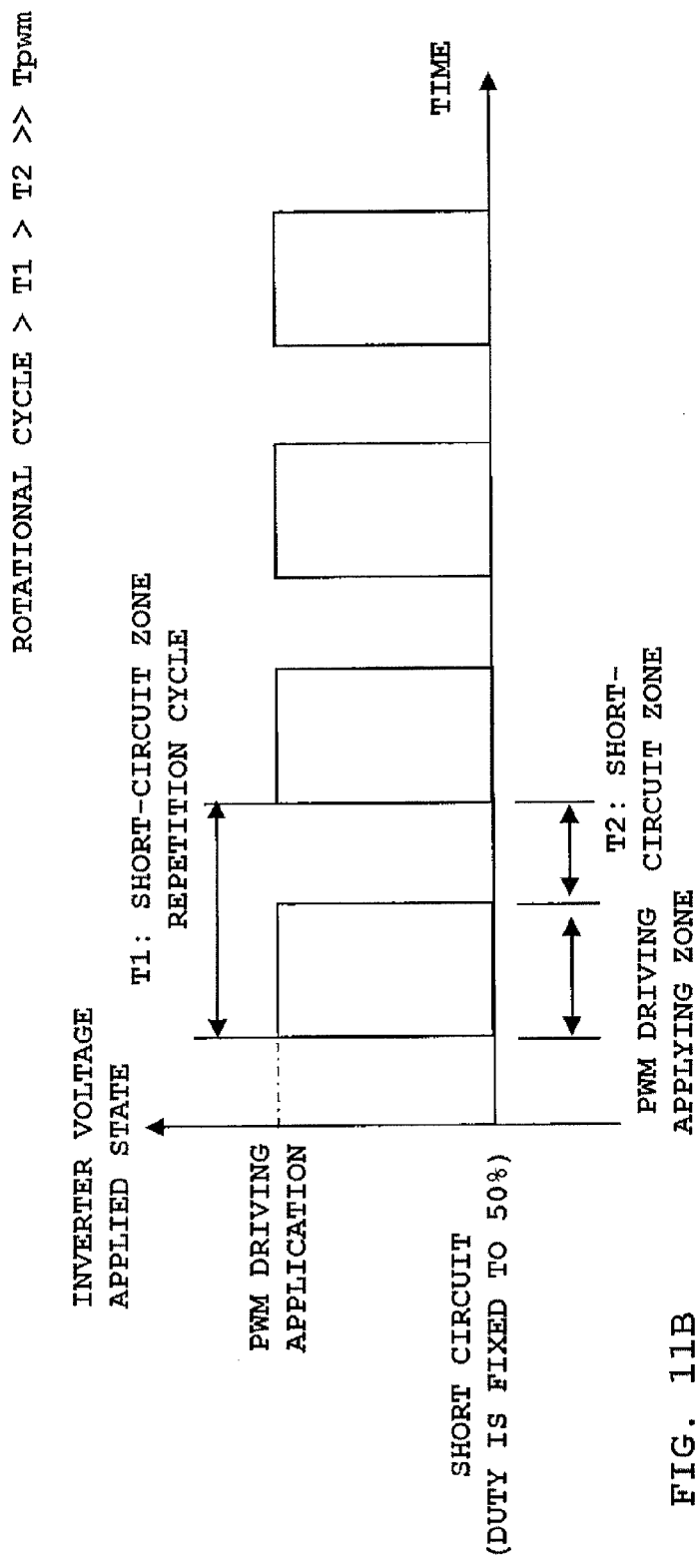
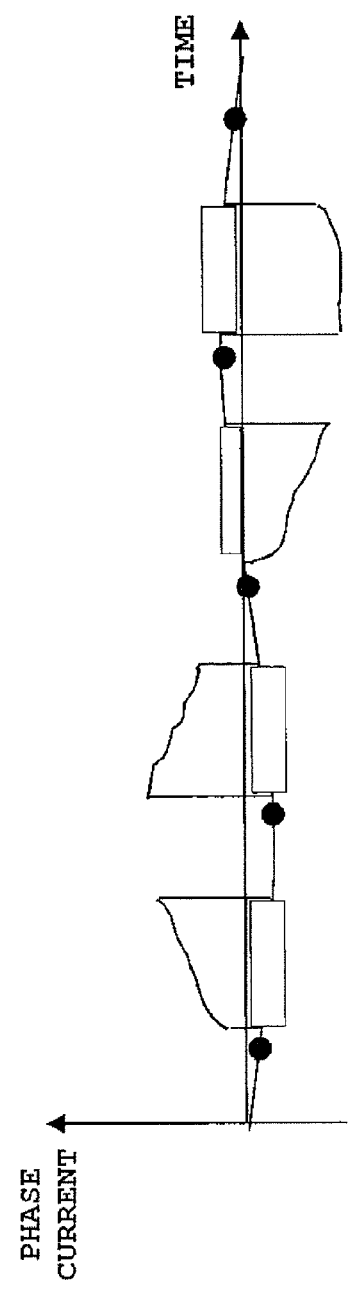
FIG. 11A
FIG. 11B

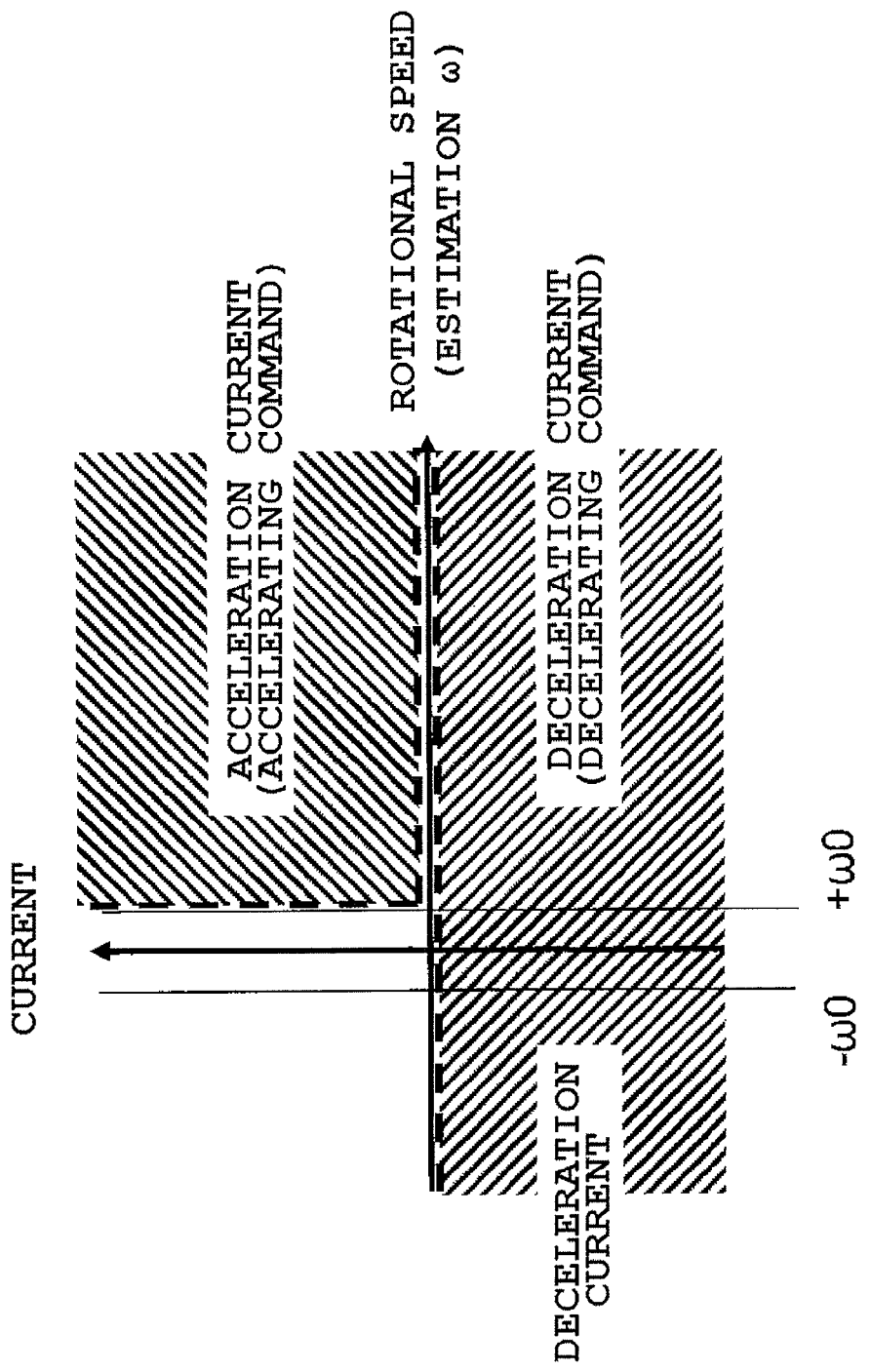

VACUUM PUMP

BACKGROUND OF THE INVENTION

1. Field of the Invention

The present invention relates to a vacuum pump, such as a turbo-molecular pump, that drives to rotate a rotor using a motor.

2. Description of the Related Art

Axial flow type vacuum pumps such as turbo molecular pumps rotate rotors having a rotor blade at a high speed for evacuation. Since such vacuum pumps discharges a rarefied gas while compressing the gas, the rotors rotate in only one direction. Hereinafter, this rotational direction is called as positive rotation. Therefore, rotor rotation in the vacuum pump is normally accelerating and decelerating motions between a still region and a positive rotation region.

Conventionally, rotational speed information and magnetic pole positional information about motor rotors are obtained as information necessary for motor drive control for rotating rotors based on detection signals of rotation sensors. However, in vacuum pumps that detect targets (having gaps) provided to rotors using inductance type gap sensors, it is difficult to detect the rotational direction using only the rotation sensors.

For this reason, normally, the above problem is handled by devising a control sequence in the motor driving (particularly, at a start time when reverse rotation likely occurs) (for example, see JP 4692891 B). However, the handing method through the devising of the control sequence has a disadvantage that an actuating time period up to the positive rotation of rotors takes a long time.

Besides the system in which the inductance type gap sensors are used as rotation sensors, a rotation sensorless control is proposed in order to improve reliability and reduce a cost. Further, DC brushless motors are employed in view of energy saving, and sine wave drive is used often as a driving method. In such vacuum pumps, a magnetic pole position and a rotational speed based on a counter electromotive voltage associated with rotation of permanent magnet attached to a motor rotor.

Normally, in a middle or high speed rotational speed region, a counter electromotive voltage is calculated from a constant of an electrically equivalent circuit (a relationship between a current and a voltage is defined) approximate to an actual motor constant, and detected motor current signal and voltage signal so that the position of magnetic pole is obtained. Since the counter electromotive voltage is proportional to a rotation number, the voltage value is weak in a low-speed rotation region like a motor starting time. On the other hand, an output voltage of a three-phase inverter is generally set to a voltage value that is equivalent to or larger than the counter electromotive voltage in a rated rotation (for example, tens of volts in a case of a turbo-molecular pump.

Therefore, for example in vacuum pumps whose rated rotation number is 1000 rps, a value of a counter electromotive voltage at 1 rps just after the starting is $1/1000$ of the value of a counter electromotive voltage at a rated time, and thus the value is about tens of millivolts. It is very difficult to accurately extract a weak counter electromotive voltage from a PWM output voltage where an on/off state is repeated at not less than tens of volts.

SUMMARY OF THE INVENTION

A vacuum pump comprises: a motor for driving to rotate a pump rotor; a sine wave driving command generating section for generating a sine wave driving command; a PWM driving command generating section for generating a PWM driving command based on the sine wave driving command; an inverter circuit, having a plurality of switching elements controlled to be on/off based on the PWM driving command, for supplying, to the motor, a driving current to be generated by turning on/off the plurality of switching elements or regenerating the driving current from the motor; an estimating section for detecting a signal including counter electromotive voltage information of the motor, and estimating a magnetic pole electric angle and a rotational speed of the motor; and a driving current controller for repeating generation and cut-off of the driving current supplied from a power supply to the motor via the inverter circuit or regenerated from the motor to the power supply in a low-speed period between a stopped state and a predetermined rotational speed in an accelerating operation at a motor starting time or a decelerating operation at a motor stopping time. The estimating section detects the signal at the cut-off time so as to estimate the magnetic pole electric angle and the rotational speed in the low-speed period.

Preferably the driving current controller repeats the supply or the regeneration of the driving current based on an on/off command of the PWM driving command, and the cut-off of the driving current by making all the plurality of switching elements be in an off state in the low-speed period, and the estimating section detects motor phase voltage at the cut-off time as the signal in the low-speed period, and estimates the magnetic pole electric angle and the rotational speed.

Preferably the driving current controller repeats the supply or the regeneration of the driving current based on an on/off command of the PWM driving command, and the cut-off of the driving current by short-circuit control such that electric potentials of the phases of the motor are uniform in the low-speed period, and the estimating section detects motor phase current at the cut-off time as the signal in the low-speed period, and estimates the magnetic pole electric angle and the rotational speed.

Preferably a period of the cut-off is longer than a PWM cycle, and the cut-off is repeated in a repetition cycle shorter than a rotation cycle.

Preferably the rotational speed is lower than the predetermined rotational speed, and a predetermined positive reverse rotational speed range with respect to the rotational speed of zero is preset, and when the rotational speed to be estimated by the estimating section is within the positive reverse rotational speed range, the estimating section outputs a constant rotational speed value instead of the estimated rotational speed and generates the magnetic pole electric angle using the rotational speed value.

Preferably the vacuum pump further comprises: a radial magnetic bearing and an axial magnetic bearing for magnetically levitating and supporting the pump rotor; and a magnetic bearing controller for controlling the radial magnetic bearing and the axial magnetic bearing. When the rotational speed at the motor starting time is within a positive reverse rotational speed range, the motor driving by the inverter circuit is stopped, the magnetic bearing controller revolves the pump rotor in a reverse direction to a motor positive rotational direction by an attraction force of the radial magnetic bearing, and rotates the pump rotor in the motor positive rotational direction.

Preferably the repetition cycle and the cut-off period in the low-speed period are switched at a plurality of stages so as to be shorter as the motor rotational speed is higher.

Preferably the vacuum pump further comprises: an amplifying section for amplifying the detected signal including the counter electromotive voltage information and switching an amplification gain at a plurality of stages; and a gain switching section for switching the amplification gain of the amplifying section so as to be larger as the rotational speed is lower in the low-speed period.

Preferably the vacuum pump further comprises: an amplifying section for amplifying the detected signal including the counter electromotive voltage information, and switching an amplification gain at a plurality of stages; and a gain switching section for switching the amplification gain of the amplifying section so as to be larger as the rotational speed is lower in the low-speed period. The number of switching stages of the amplification gain is equal to the number of switching stages of the repetition cycle and the cut-off period, and the rotational speed at the amplification gain switching time is equal to the rotational speed at the time of switching the repetition cycle and the cut-off period.

BRIEF DESCRIPTION OF THE DRAWINGS

FIGS. 8A and 8B are diagrams illustrating one example of open zone setting;

FIGS. 11A and 11B are diagrams illustrating one example of short-circuited zone setting;

FIG. 12 is a diagram illustrating a relationship between an estimated rotational speed and Iq setting;

DETAILED DESCRIPTION OF PREFERRED EMBODIMENTS

Embodiments for carrying out the present invention are described below with reference to the drawings.

—First Embodiment—

Figure 1:
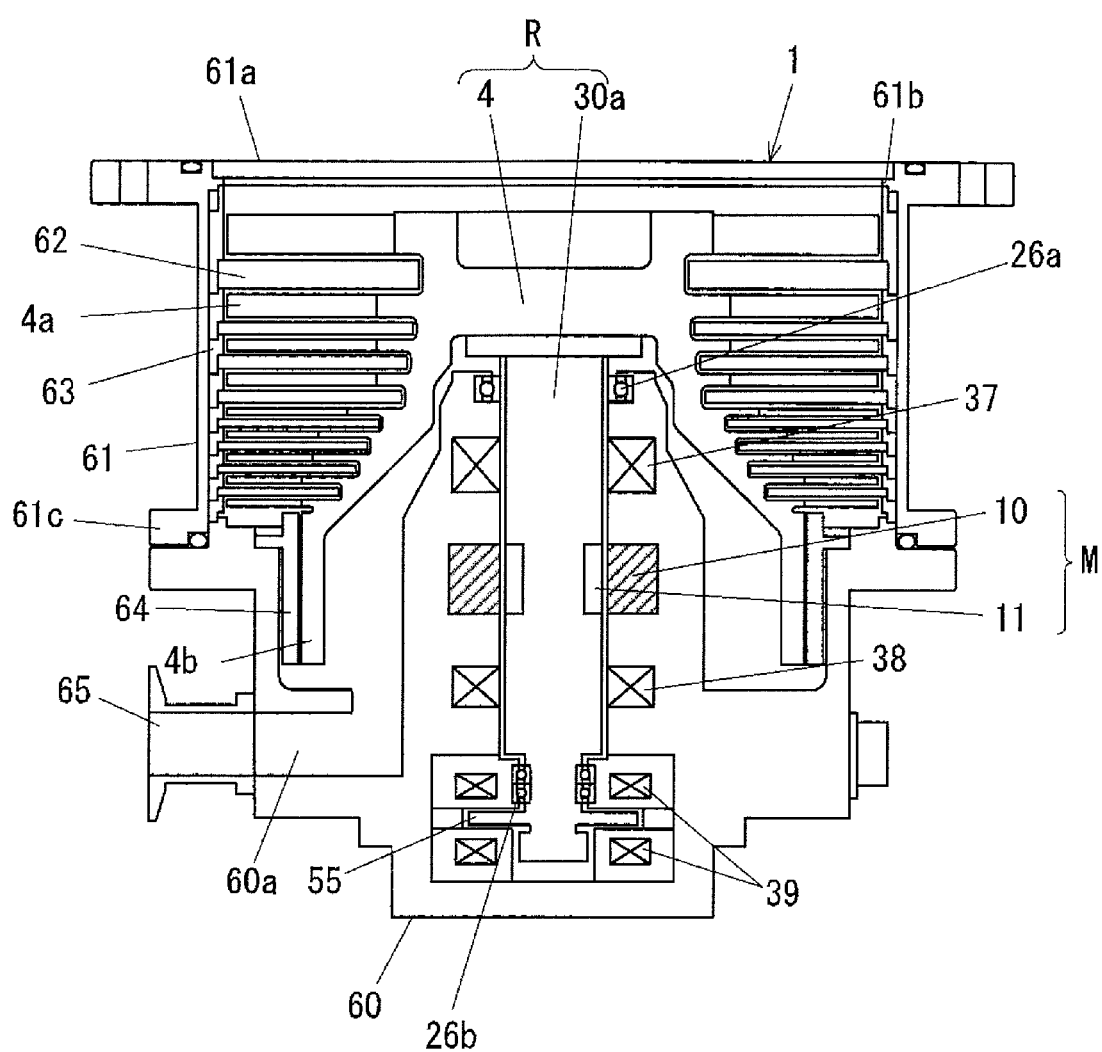
FIG. 1 is a diagram illustrating a constitution of a pump unit in a vacuum pump according to an embodiment.

FIG. 1 is a diagram describing a vacuum pump according to a first embodiment. The vacuum pump shown in FIG. 1 is a magnetically levitation type turbo-molecular pump, and FIG. 1 illustrates a constitution of a pump unit 1 of the turbo-molecular pump. The turbo-molecular pump has the pump unit 1 shown in FIG. 1 and a control unit (not shown) for driving the pump unit 1.

The pump unit 1 has a turbo pump stage composed of a rotor blade 4a and a stationary blade 62, and a drag pump stage (a thread groove pump) composed of a cylindrical section 4b and a screw stator 64. The thread groove is formed on the screw stator 64 side, but the thread groove may be formed on the cylindrical section 4b side. The rotor blade 4a and the cylindrical section 4b as a rotation-side evacuating function section are formed on a pump rotor 4. The pump rotor 4 is fastened to a shaft 30a. The pump rotor 4 and the shaft 30a compose a rotor unit R.

A plurality of turbine blades is formed along an outer periphery of the pump rotor 4 so that a rotor blade for one stage is constituted. The pump rotor 4 is formed with a plurality of stages of rotor blades in an axial direction. The plurality of stages of the stationary blades 62 and the rotor blades 4a are arranged alternately in the axial direction. Each of the stationary blades 62 is placed on a base 60 via each spacer ring 63. When a fixed flange 61c of a pump case 61 is fixed to the base 60 by a bolt, the laminated spacer rings 63 are held between the base 60 and a locking section 61b of the pump case 61 so that the stationary blade 62 is located.

The shaft 30a is supported in a non-contact manner by radial magnetic bearings 37 and 38 and an axial magnetic bearing 39 provided on the base 60. Each of the magnetic bearings 37, 38 and 39 has an electromagnet and a displacement sensor. The displacement sensor detects a levitation position of the shaft 30a. The electromagnet composing the axial magnetic bearing 39 is arranged so as to hold a rotor disc 55 provided to a lower end of the shaft 30a in an axial direction. The shaft 30a is driven to be rotated by a motor M.

The motor M is a synchronous motor, and for example, a permanent magnet synchronous motor is used. The motor M has a motor stator 10 arranged on the base 60, and a motor rotor 11 provided to the shaft 30a. The motor rotor 11 is provided with a permanent magnet. When the magnetic bearings do not operate, the shaft 30a is supported by emergency mechanical bearings 26a and 26b.

An exhaust opening 60a of the base 60 is provided with an exhaust port 65, and a back pump is connected to the exhaust port 65. When the rotor unit R is magnetically levitated and is simultaneously driven to be rotated at a high speed by the motor M, gaseous molecules on a suction port 61a side are exhausted to the exhaust port 65.

Figure 2:
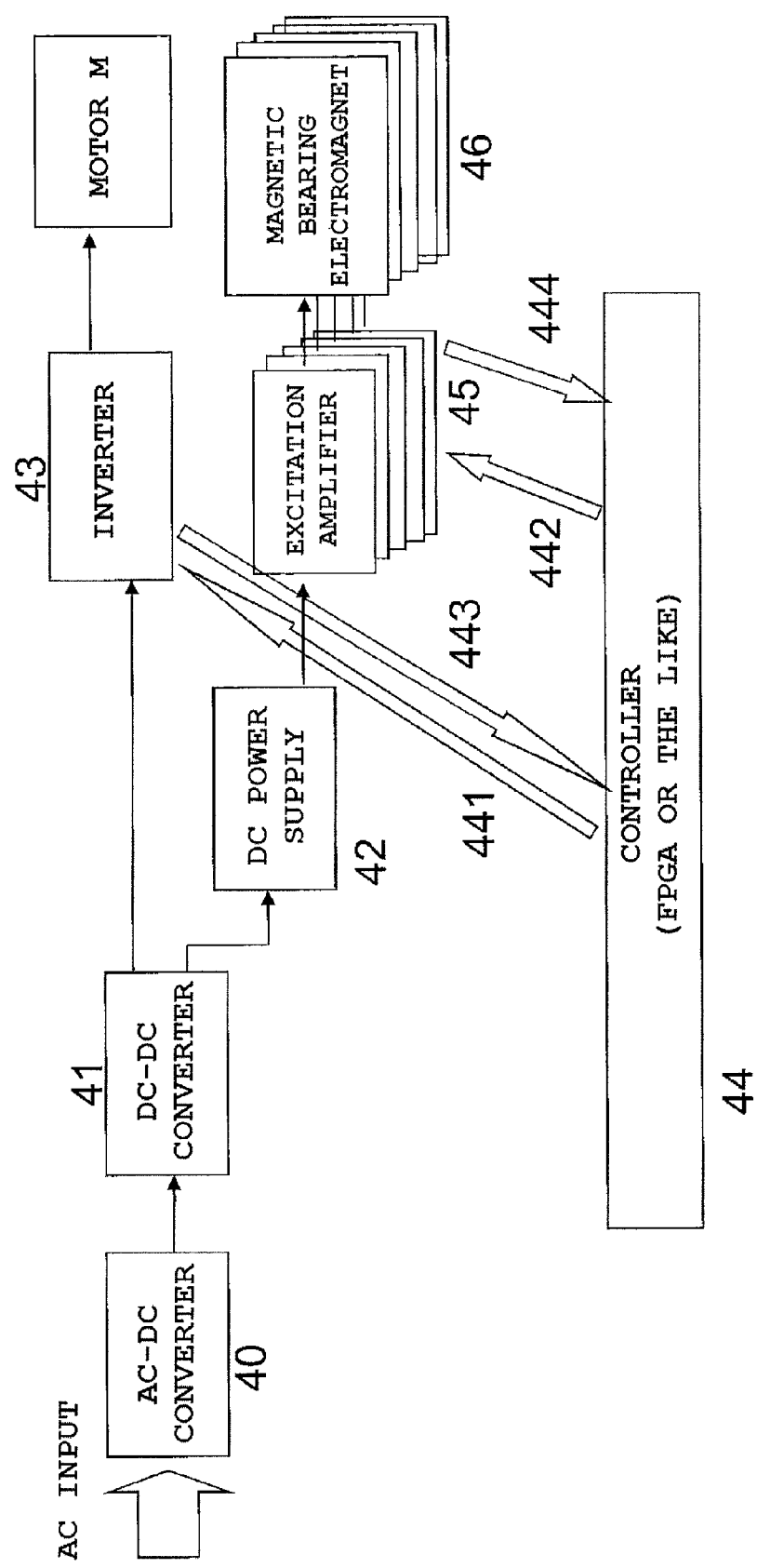
FIG. 2 is a block diagram illustrating a schematic constitution of a control unit.

FIG. 2 is a block diagram illustrating a schematic constitution of a control unit. An AC input from an outside is converted into a DC output (DC voltage) by an AC/DC converter 40 provided to the control unit. The DC voltage output from the AC/DC converter 40 is input into a DC/DC converter 41, and the DC/DC converter 41 generates the DC voltage for the motor M and the DC voltage for the magnetic bearings.

The DC voltage for the motor M is input into an inverter 43. In a rotation drive state of the motor M, a driving current is supplied to the motor M via an inverter 43 by an electric power generated by a DC/DC converter (DC power supply) 41 at an acceleration driving time. On the other hand, at a deceleration driving time, the driving current is regenerated from the motor M via the inverter 43 by an electric power obtained by converting a rotation energy of the motor rotor, and the electric power is returned to the DC/DC converter (DC power supply) 41. The DC/DC converter (DC power supply) 41 to which the electric power is returned has an ability for maintaining an output voltage constant. The DC voltage for the magnetic bearings is input into a DC power supply 42 for the magnetic bearings. The magnetic bearings 37, 38 and 39 compose the five-axis magnetic bearings, each of the magnetic bearings 37 and 38 has two pairs of electromagnets 46, and the magnetic bearing 39 has a pair of electromagnets 46. A current is supplied to five pairs of the electromagnets 46, namely, the ten electromagnets 46 individually from ten excitation amplifiers 45 provided for them.

The controller 44 for controlling the driving of the motor M and the driving of the magnetic bearings is composed of, for example, a digital arithmetic unit such as FPGA (Field Programmable Gate Array) and its peripheral circuit. The controller 44 outputs, to the inverter 43, a PWM control signal 441 for controlling ON/OFF of a plurality of switching elements included in the inverter 43, and outputs, to the excitation amplifiers 45, a PWM control signal 442 for controlling ON/OFF of switching elements included in the excitation amplifiers 45. Further, a signal relating to the motor M (a signal relating to a phase voltage or a phase current) 443 is input into the controller 44 as described later. Further, signals relating to the magnetic bearings (exciting current signal and displacement signal) 444 are input.

Figure 3:
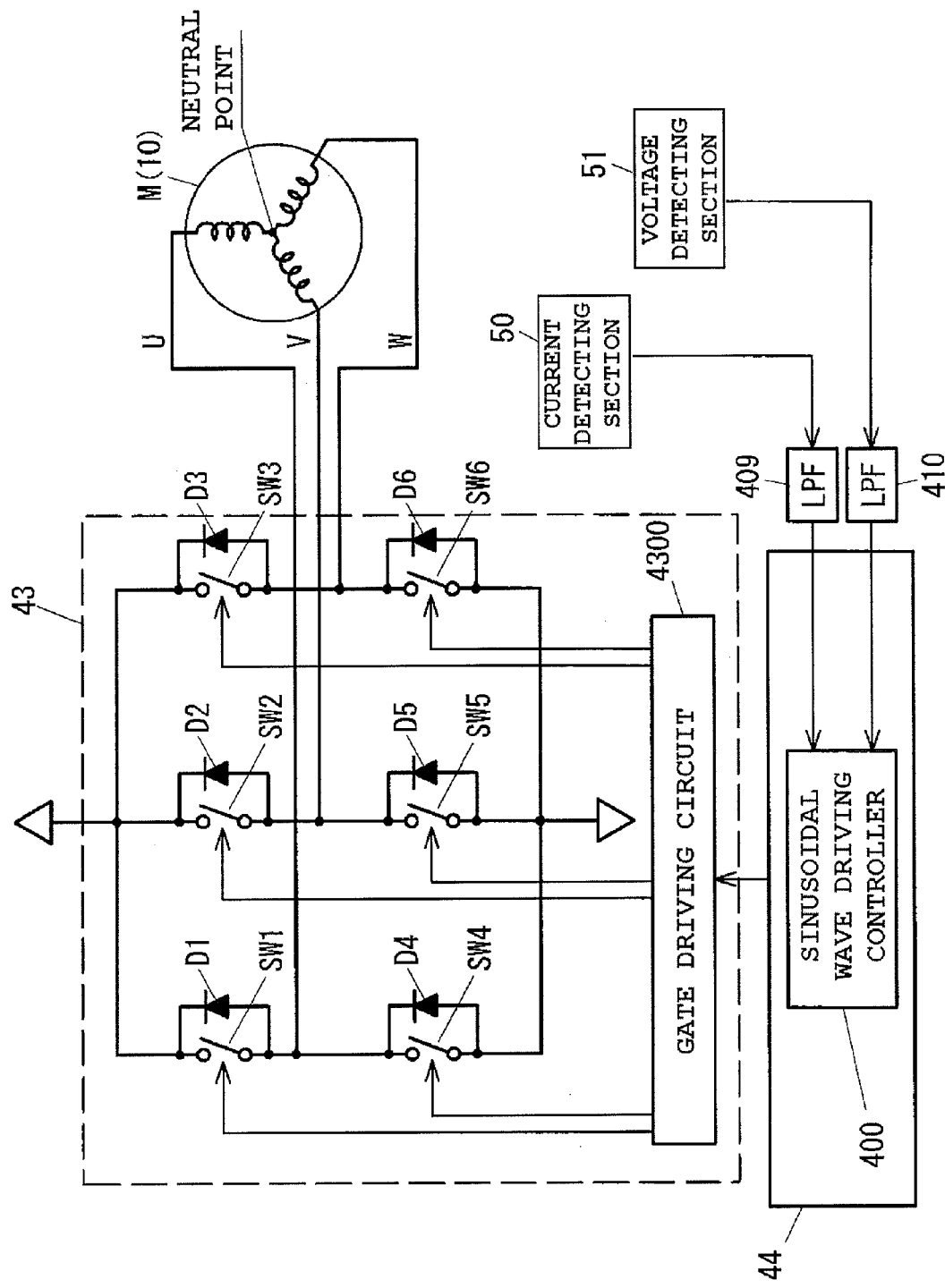
FIG. 3 is a diagram illustrating a motor driving control system relating to a motor.

FIG. 3 is a diagram illustrating a motor driving control system relating to the motor M. The motor driving control system has a sinusoidal wave driving controller 400 and the inverter 43. The inverter 43 has a plurality of switching elements SW1 to SW6, and a gate driving circuit 4300 for driving the switching elements SW1 to SW6 into the ON/OFF state. Power semiconductor elements such as MOSFET and IGBT are used as the switching elements SW1 to SW6. Reflux diodes D1 to D6 are connected to the switching elements SW1 to SW6 in parallel, respectively.

Currents flowing in U, V and W-phase coils of the motor stator 10 are detected by a current detecting section 50, and current detection signals as detected results are input into the sinusoidal wave driving controller 400 of the controller 44 via a low-pass filter 409. Further, terminal and neutral point voltages of U, V and W-phase coils are detected by a voltage detecting section 51, and voltage detection signals as detected results are input into the sinusoidal wave driving controller 400 via a low-pass filter 410.

The sinusoidal wave driving controller 400 generates a PWM control signal for ON/OFF control of the switching elements SW1 to SW6 based on the current detection signals and the voltage detection signals from which noises are removed by the low-pass filters 409 and 410. The gate driving circuit 4300 generates a gate driving signal based on the PWM control signal, and turns on/off the switching elements SW1 to SW6. As a result, the voltages that are modulated into a sinusoidal wave and undergo PWM are applied to the U, V and W-phase coils.

In this embodiment, a rotational speed and a magnetic pole position are estimated based on motor current detection signals and motor voltage detection signals. In a case of a sensorless motor without a rotation sensor for detecting a rotating position of the motor rotor 11 like this embodiment, the rotational speed and the magnetic pole position are generally estimated based on the motor current detection signals and the motor voltage detection signals.

(Description about the Sinusoidal Wave Driving Controller 400)

Figure 4:
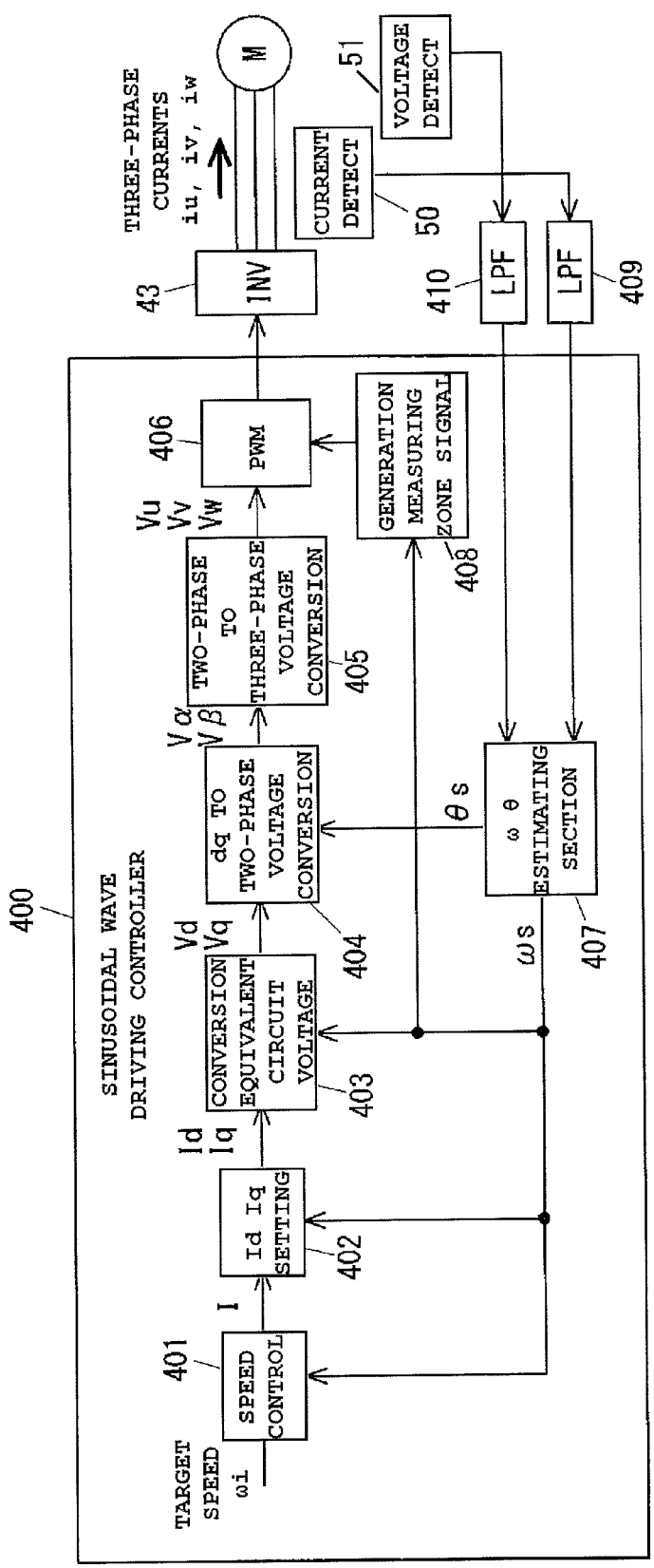
FIG. 4 is a block diagram describing a sinusoidal wave driving controller.

FIG. 4 is a block diagram describing the sinusoidal wave driving controller 400. As described with reference to FIG. 3, a three-phase current flowing in the motor M is detected by the current detecting section 50, and a detected current detection signal is input into the low-pass filter 409. On the other hand, a three-phase voltage of the motor M is detected by the voltage detecting section 51, and a detected voltage detection signal is input into the low-pass filter 410.

The current detection signals that pass through the low-pass filter 409 and the voltage detection signals that pass through the low-pass filter 410 are input into a rotational speed/magnetic pole position estimating section 407. Although details are described later, the rotational speed/magnetic pole position estimating section 407 estimates a rotational speed ω and a magnetic pole position (an electric angle θ) of the motor M based on the current detection signals and the voltage detection signals. Since the magnetic pole position is expressed by the electric angle θ, the magnetic pole position is called as a magnetic pole electric angle θ below. The rotational speed/magnetic pole position estimating section 407 outputs a rotational speed ωs and a magnetic pole electric angle θs depending on an estimated value ω. The rotational speed ωs is input into a speed controller 401, an Id and Iq setting section 402, an equivalent circuit voltage converting section 403 and a measuring zone signal generating section 408. The magnetic pole electric angle θs is input into a dq to two-phase voltage converting section 404.

In the first embodiment, the estimated rotational speed ω and magnetic pole electric angle θ are directly output as the rotational speed ωs and the magnetic pole electric angle θs (ωs=ω, θs=θ), but in a second embodiment, described later, the rotational speed ωs and the magnetic pole electric angle θs that are output depending on the estimated rotational speed ω are different. For this reason, also in the first embodiment, the estimated rotational speed ω and magnetic pole electric angle θ are discriminated from the output rotational speed ωs and magnetic pole electric angle θs so as to be expressed.

Figure 5:
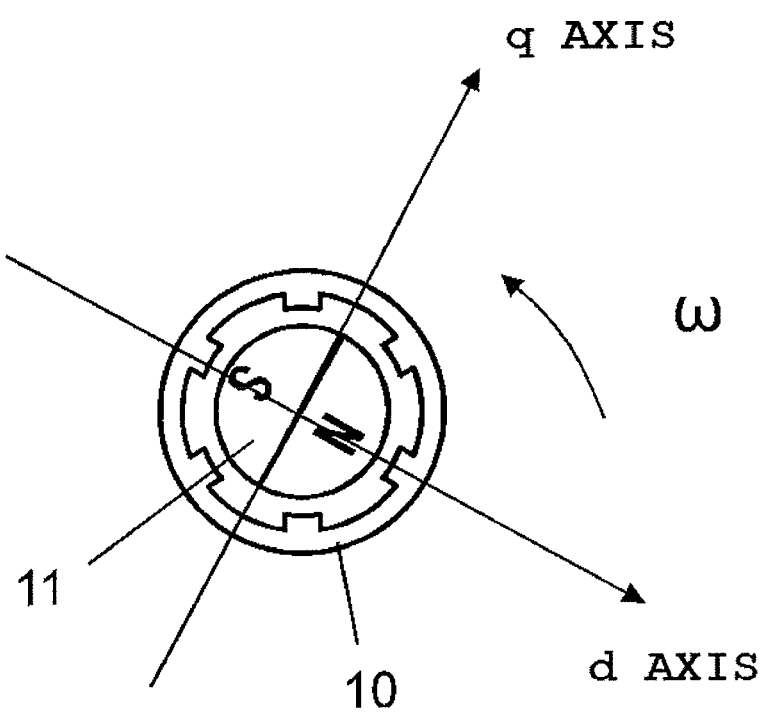
FIG. 5 is a diagram describing directions of d axis and q axis.

The speed controller 401 performs PI control (proportional control and integral control) or P control (proportional control) based on a difference between an input target rotational speed ωi and a present rotational speed ωs output from the rotational speed/magnetic pole position estimating section 407 so as to output a current command I. Although details are described later, the Id and Iq setting section 402 sets current commands Id and Iq in a rotating coordinate dq system based on the current command I and the rotational speed ωs. As shown in FIG. 5, a d axis of the rotating coordinate dq system is a coordinate axis in which an N pole of the rotating motor rotor 11 is a positive direction. A q axis is a coordinate axis that leads by 90° perpendicularly to the d axis, and its direction is a direction of a counter electromotive voltage at the positive rotation time.

The equivalent circuit voltage converting section 403 converts the current commands Id and Iq into voltage commands Vd and Vq in the rotating coordinate dq system using Formula (1) based on an electric equivalent circuit constant of the motor M and the rotational speed ωs input from the rotational speed/magnetic pole position estimating section 407. The equivalent circuit is divided into a resistance component r and an inductance component L of a motor coil. The values r and L are obtained from motor specifications or the like and they are stored in a storage section (not shown) in advance.

$$\begin{pmatrix} Vd \\ Vq \end{pmatrix} = \begin{pmatrix} r & -\omega s \cdot L \\ \omega s \cdot L & r \end{pmatrix} \begin{pmatrix} Id \\ Iq \end{pmatrix} \quad (1)$$

The dq to two-phase voltage converting section 404 converts the voltage commands Vd and Vq in the rotating coordinate dq system into voltage commands Vα and Vβ of a fixed coordinate αβ system based on the converted voltage commands Vd and Vq and the magnetic pole electric angle θs input from the rotational speed/magnetic pole position estimating section 407. A two-phase to three-phase voltage converting section 405 converts the two-phase voltage commands vα and vβ into three-phase voltage commands Vu, Vv and Vw. A PWM signal generating section 406 generates a PWM control signal for turning on/off (conductive or cut off) the six switching elements SW1 to SW6 provided to the inverter 43 based on the three-phase voltage commands Vu, Vv and Vw. The inverter 43 turns on/off the switching elements SW1 to SW6 based on the PWM control signal input from the PWM signal generating section 406 so as to apply a driving voltage to the motor M.

(Description about the Rotational Speed/Magnetic Pole Position Estimating Section 407)

Figure 6:
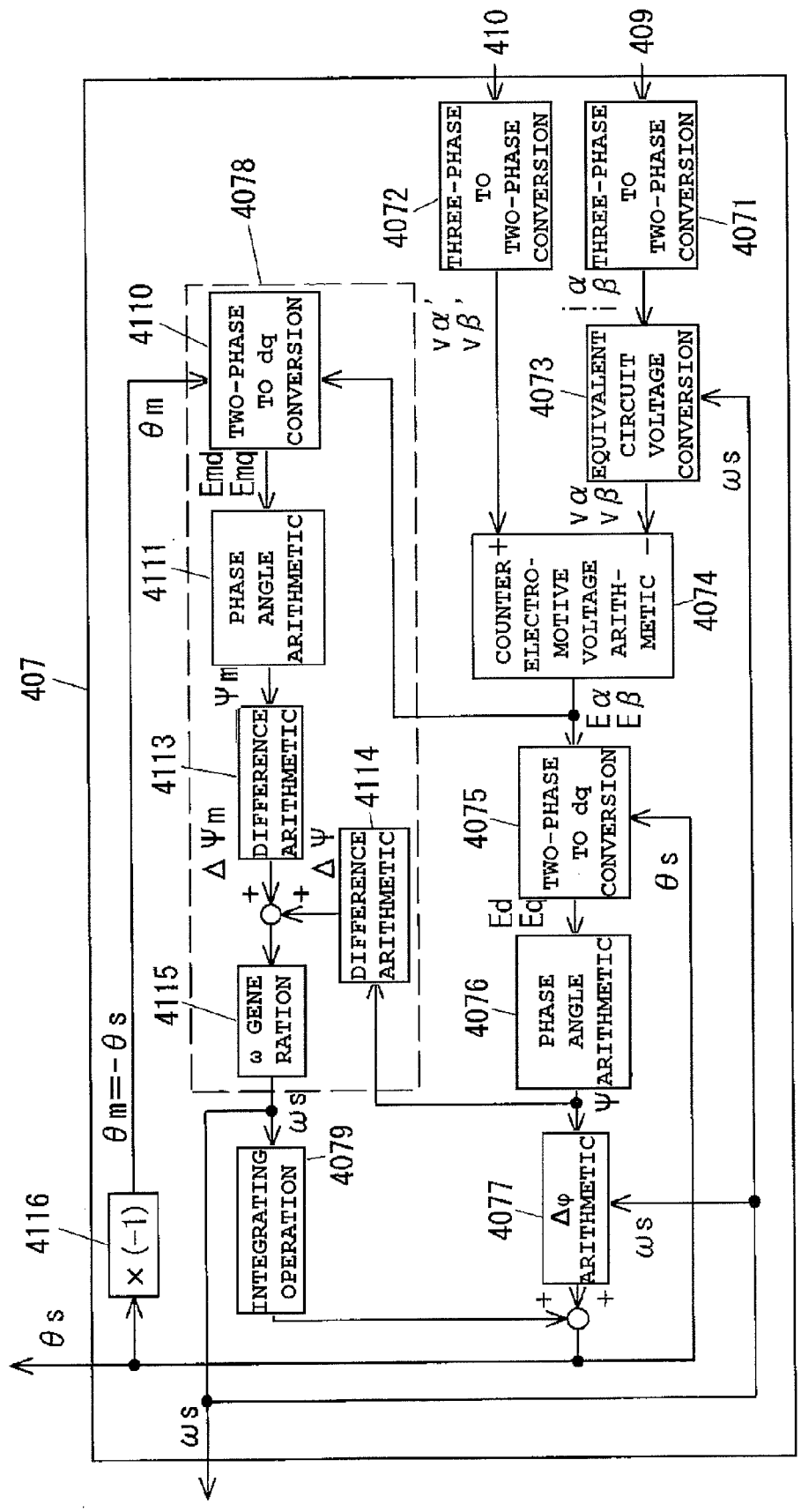
FIG. 6 is a diagram illustrating details of a rotational speed/magnetic pole position estimating section.

FIG. 6 is a diagram illustrating details of the rotational speed/magnetic pole position estimating section 407. Phase voltage detection signals vv, vu and vw output from the voltage detecting section 51 are input into a three-phase to two-phase converting section 4072 via the low-pass filter 410. The three-phase to two-phase converting section 4072 converts three-phase voltage signals into two-phase voltage signals vα' and vβ'. The converted voltage signals vα' and vβ' are input into a counter electromotive voltage arithmetic section 4074.

On the other hand, phase current detection signals iv, iu and iw output from the current detecting section 50 are input into a three-phase to two-phase converting section 4071 via the low-pass filter 409. The three-phase to two-phase converting section 4071 converts three-phase current detection signals iv, iu and iw into two-phase current signals iα and iβ. The converted current signals iα and iβ are input into an equivalent circuit voltage converting section 4073.

The equivalent circuit voltage converting section 4073 converts the current signals iα and iβ into voltage signals vα and vβ using Formula (2) below based on the electric equivalent circuit constant of the motor M. The converted voltage signals vα and vβ are input into the counter electromotive voltage arithmetic section 4074. The equivalent circuit is divided into the resistance component r and the inductance component L of the motor coil. The values r and L are obtained from motor specifications or the like and they are stored in a storage section (not shown) in advance.

$$\begin{pmatrix} v\alpha \\ v\beta \end{pmatrix} = \begin{pmatrix} r & -\omega s \cdot L \\ \omega s \cdot L & r \end{pmatrix} \begin{pmatrix} i\alpha \\ i\beta \end{pmatrix} \quad (2)$$

The counter electromotive voltage arithmetic section 4074 calculates counter electromotive voltages Eα and Eβ using Formula (3) below from the voltage signals vα' and vβ' based on motor three-phase voltages and the voltage signals vα and vβ based on motor three-phase currents. As described later, the rotational speed/magnetic pole position estimating section 407 estimates the rotational speed ω and the magnetic pole electric angle θ based on counter electromotive voltages Eα and Eβ calculated by the counter electromotive voltage arithmetic section 4074.

$$\begin{pmatrix} E\alpha \\ E\beta \end{pmatrix} = \begin{pmatrix} v\alpha' \\ v\beta' \end{pmatrix} - \begin{pmatrix} r & -\omega s \cdot L \\ \omega s \cdot L & r \end{pmatrix} \begin{pmatrix} i\alpha \\ i\beta \end{pmatrix} \quad (3)$$

In the first embodiment, after the counter electromotive voltage arithmetic section 4074 calculates the counter electromotive voltages Eα and Eβ, the rotational speed/magnetic pole position estimating section 407 calculates the rotational speed ω and a magnetic pole phase shift correcting amount Δφ based on the counter electromotive voltages Eα and Eβ, and estimates a magnetic pole electric angle θ from the rotational speed ω and the magnetic pole phase shift correcting amount Δφ.

The rotational speed ω is an amount of periodicity of the magnetic pole electric angle θ. On the other hand, the magnetic pole phase shift correcting amount Δφ is an amount relating to a phase shift between an actual magnetoelectric angle θr and an estimated magnetic pole electric angle θ. The magnetic pole electric angle θ (=θs) is calculated from the calculated rotational speed ω (ω=ωs) and magnetic pole phase shift correcting amount Δφ in accordance with θ=∫(ωs)dt+Δφ.

The calculation of the magnetic pole phase shift correcting amount Δφ is described. The rotational speed of a motor rotor 11 does not abruptly change within one rotational cycle due to rotary inertia of the rotor, and thus changes slowly in at least a several cycles, and this can be regarded as steady-state response. Therefore, a two-phase to dq voltage converting section 4075 converts the input counter electromotive voltages (Eα and Eβ) into counter electromotive voltages (Ed and Eq) in the rotating coordinate dq system by conversion expressed by Formula (4). The magnetic pole electric angle θs that is calculated at the previous calculation timing in the calculation performed at a predetermined time interval T (an interval of the control sampling timing) is fed back to the angle θs in Formula (4).

$$\begin{pmatrix} Ed \\ Eq \end{pmatrix} = \begin{pmatrix} \cos\theta s & \sin\theta s \\ -\sin\theta s & \cos\theta s \end{pmatrix} \begin{pmatrix} E\alpha \\ E\beta \end{pmatrix} \quad (4)$$

Coordinate conversion using complex notation is as follows. An α component Eα and a β component Eβ of the counter electromotive voltages (Eα and Eβ) correspond to a real part and an imaginary part of E×exp(j (θr+π/2)) when ωs>0. Further, the voltages Eα and Eβ correspond to a real part and an imaginary part of E×exp (j (θr−π/2)) when ωs<0. E represents a level of a counter electromotive voltage, and θr represents the actual magnetic pole electric angle.

On the contrary, the two-phase to dq coordinate conversion to which the estimated magnetic pole electric angle θ (=θs) is applied is expressed by multiplying a counter electromotive voltage, that is notated by complex, by exp (−j θs). Therefore, the counter electromotive voltages (Ed and Eq) that are subject to the two-phase to dq coordinate conversion are expressed by an real part and an imaginary part of E×exp (j (θr+π/2−θs)) when ωs>0. The counter electromotive voltages (Ed and Eq) are expressed by an real part and an imaginary part of E×exp (j (θr−π/2−θs)) When ωs<0.

Figure 7A:
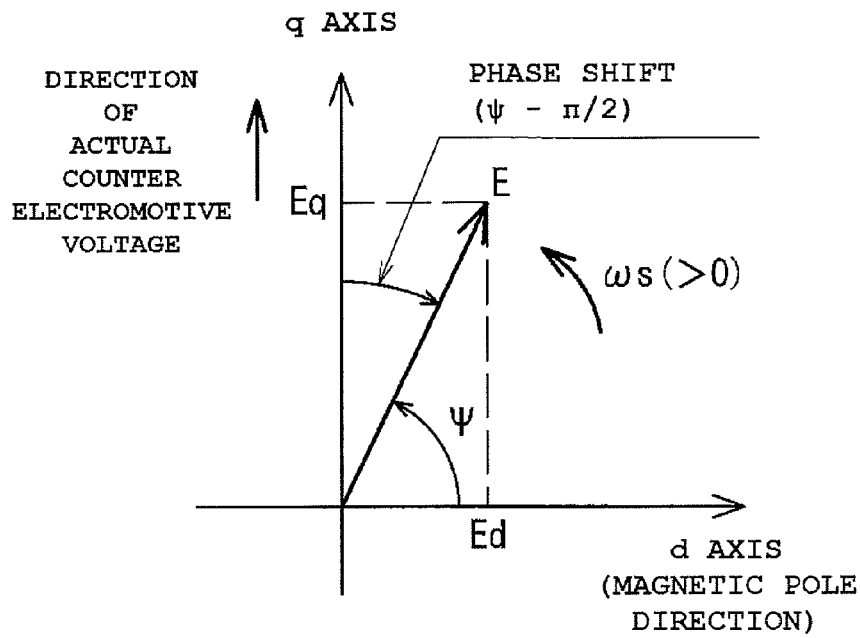
FIGS. 7A and 7B are diagrams each describing a magnetic pole phase shift in a rotating coordinate dq system.
Figure 7B:
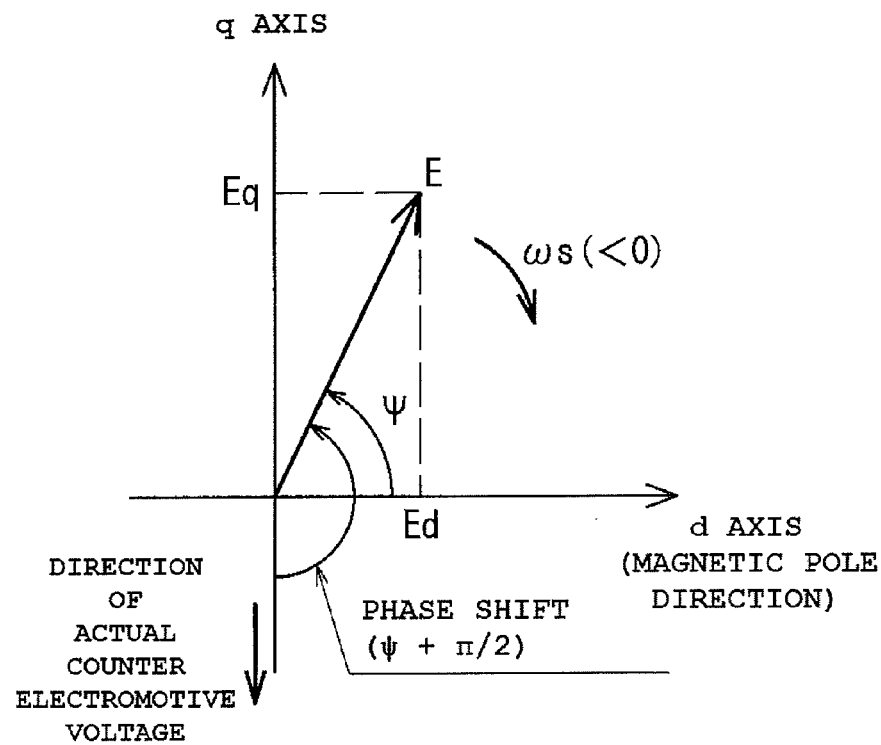

A phase angle arithmetic section 4076 calculates a vector phase angle Ψ of the counter electromotive voltages (Ed and Eq) in the rotating coordinate dq system in accordance with Ψ=tan$^{-1}$ (Eq/Ed) by applying a function of the four-quadrant arc tangent. When ωs>0, the phase angle Ψ is such that Ψ=θr+π/2−θs, and when ωs<0, it is such that Ψ=θr−π/2−θs. FIG. 7 is a diagram describing a magnetic pole phase shift in the rotating coordinate dq system, FIG. 7A illustrates a case where the positive rotation (ωs>0), and FIG. 7B illustrates a case of the reverse rotation (ωs<0). Therefore, when the magnetic pole electric angle θs to be estimated is converged to the actual magnetic pole electric angle θr, and when ωs>0, the control is performed so that Ψ−π/2 converges to zero. When ωs<0, the control is performed so that Ψ+π/2 converges to zero.

A correcting amount Δϕ arithmetic section 4077 calculates the magnetic pole phase shift correcting amount Δϕ for correcting the magnetic pole phase shift. That is to say, the correction is made by adding the magnetic pole phase shift correcting amount Δϕ to the estimated magnetic pole electric angle so that Ψ−π/2 converges to zero in the positive rotation, and Ψ+π/2 converges to zero in the reverse rotation.

When ωs>0, the magnetic pole phase shift correcting amount Δϕ is generated by multiplication by a suitable gain g1 (a gain of proportional control or a gain of proportional control·integral control) based on a value of Ψ−π/2(rad) (a change amount of the negative and positive rotation) as expressed by Formula (5). According to Formula (5), when Ψ−π/2<0 (namely, θr<θ), Δϕ<0 as shown in FIG. 7A. That is to say, the magnetic pole electric angle θ that is a leading phase with respect to the actual magnetic pole electric angle θr is approximated to θr.

Δϕ=g1×(Ψ−π/2): in a case where Ψ−π/2≠0

Δϕ=0: in a case where Ψ−π/2=0     (5)

When ωs<0, the magnetic pole phase shift correcting amount Δϕ is set as expressed in Formula (6). For example, in a case of FIG. 7B, since Ψ+π/2>0 (namely, θr>θs), Δϕ>0, and thus the magnetic pole electric angle θs that is a delay phase with respect to the actual magnetic pole electric angle θr is approximated to θs.

Δϕ=g1×(Ψ+π/2): in a case where Ψ+π/2≠0

Δϕ=0: in a case where Ψ+π/2=0     (6)

On the other hand, separately from the calculation of the magnetic pole phase shift correcting amount Δϕ, a rotational speed arithmetic section 4078 performs estimating calculation of the rotational speed ω (=ωs). A two-phase to dq voltage converting section 4110 of a rotational speed arithmetic section 4078 calculates counter electromotive voltages (Emd and Emq) in a rotating coordinate dq system using Formula (7) below based on the counter electromotive voltages (Eα and Eβ) input from the counter electromotive voltage arithmetic section 4074 and an electric angle θm output from a sign inverting section 4116. The electric angle θm to be used here is obtained by multiplying the estimated magnetic pole electric angle θs by (−1) in the sign inverting section 4116 differently from the magnetic pole electric angle θ to be used in the two-phase to dq voltage converting section 4075.

$$\begin{pmatrix} Emd \\ Emq \end{pmatrix} = \begin{pmatrix} \cos\theta m & \sin\theta m \\ -\sin\theta m & \cos\theta m \end{pmatrix} \begin{pmatrix} E\alpha \\ E\beta \end{pmatrix} \quad (7)$$

A phase angle arithmetic section 4111 calculates a phase angle Ψm using Formula (8) below. As described above, in the fixed coordinate αβ system, the counter electromotive voltage vectors (Eα and Eβ) rotate at a rotational speed ω (=ωs). On the other hand, in the rotating coordinate dq system, when the rotational speed ω (=ωs) to be estimated converges to the actual rotational speed ωr, the phases Ψm of the counter electromotive voltages (Emd and Emq) being subject to two-phase to dq voltage conversion using the magnetic pole electric angle θm obtains a constant value. On the contrary, when not converge, the phase Ψm changes.

Ψm=tan$^{-1}$ (Emq/Emd)     (8)

The difference arithmetic section 4113 calculates a difference ΔΨm of the phase Ψm. In this case, a present phase angle Ψm is calculated this time when arithmetic is repeated at a control sampling time T, and a phase angle Ψm calculated at each predetermined time T1 that is a natural number multiple of T is stored as a past (previous) phase angle in advance, so that a difference ΔΨm between the present phase angle and the past (previous) phase angle is calculated. On the other hand, the difference arithmetic section 4114 calculates the difference ΔΨ using the phase angle Ψ output from a phase angle arithmetic section 4076. Instead of the difference operation, a differential operation may be performed.

As described above, when ωs>0, the value Ψ is such that Ψ=θr+π/2−θs, and when ωs<0, Ψ=θr−π/2−θs. However, when the difference ΔΨ is obtained between the predetermined times T1, it is expressed as ΔΨ=Δθr−Δθs=(ωr−ωs) T1 regardless of the rotational direction (positive or negative value of ωs). Similarly, the phase angle Ψm is expressed as ΔΨm=Δθr−Δθm=Δθr+Δθs=(ωr+ωs) T1.

When the difference ΔΨm output from the difference arithmetic section 4113 and the difference ΔΨ output form the difference arithmetic section 4114 are added at a summing point, ΔΨ+ΔΨm=2ωr·T1. A ω generating section 4115 multiplies the input ΔΨm+ΔΨ=2ωr·T by 0.5, and then divides the value by the time T1, so as to calculate the rotational speed ω. In this embodiment, the estimated rotational speed ω is output from the ω generating section 4115 as the rotational speed ωs. The rotational speed ωs output from the ω generating section 4115 is input into an integration operating section 4079, a correcting amount Δϕ arithmetic section 4077, and an equivalent circuit voltage converting section 4073, and is output from the rotational speed/magnetic pole position estimating section 407.

The integration operating section 4079 calculates an integrate value of the rotational speed ωs. When the integrated value is expressed by using the control sampling time T, the integrated value (next time)=the integrated value (present value)+ωs×T. A sum (Formula (9) below) of the integrated value and the magnetic pole phase shift correcting amount Δφ calculated by the correcting amount Δφ arithmetic section 4077 is input into the two-phase to dq voltage converting section 4075 as the magnetic pole electric angle θs at next control timing after the time T passes from this control timing, and is output from the rotational speed/magnetic pole position estimating section 407.

$$\theta s \text{ (next time)} = \text{integrated value (next time)} + \Delta\phi \quad (9)$$

As described above, the ω generating section 4115 executes the process for extracting the actual rotational speed ωr such as $(\Delta\Psi m + \Delta\Psi)/2T = \omega r$. However, since actually the differences ΔΨm and ΔΨ include an error, the rotational speed ω does not always matches with an actual rotational speed ωr. However, since the actual rotational speed ωr is extracted, the rotational speed ωs and the integrated value ∫(ωs)dt can be estimated more accurately. This is an effect particularly for a case where the rotational speed is low, and a case where the control sampling interval T is set to be longer.

(About Control in Low-Speed Rotation Region)

Formula (3) relating to the calculation of the counter electromotive voltages holds in a case of steady-state response where a time variation in amplitudes of currents and voltages is relatively small, but in normal operation, since the variation can be regarded as being sufficiently small, Formula (3) can be applied. The magnitudes of the voltage vectors (Eα and Eβ) E $(=\sqrt{(E\alpha\ \hat{}\ 2 + E\beta\ \hat{}\ 2)})$ are voltages proportional to the rotation number, and have small values in the superlow speed rotation region (for example, at the motor starting time). On the other hand, the output voltage from the inverter 43 is normally a PWM output, but this voltage value is equivalent to or larger than the counter electromotive voltage at the rated rotation (tens of volts as one example of the turbo-molecular Pump).

Therefore, for example, the value of the counter electromotive voltage at about 1 rps just after starting by a rotating machine (vacuum pump or the like) whose rated rotation number is 1000 rps is 1/1000 of the value of the counter electromotive voltage at the rated rotation time, and thus is about tens of millivolts. For this reason, even if a low-pass filter is employed, it is very difficult to accurately extract a component of a weak counter electromotive voltage with tens of millivolts at the starting time from a PWM output voltage which repeats on/off states at not less than tens of volts. According to the present invention, the weak counter electromotive voltage is accurately measured, and the motor can be quickly started based on the measured result.

A method for detecting the counter electromotive voltage in a rotation region where the counter electromotive voltage is weak is first described. Ina conventional detection control using Formula (3), a lower limit value of a rotational speed at which the counter electromotive voltage is detectable is ω1 (ω1>0). That is to say, in the conventional method, when the rotational speed ωs is such that −ω1<ωs<+ω1, it is difficult to acquire the accurate counter electromotive voltage regardless of the positive rotation and the reverse rotation. The range of the rotational speed (−ω1<ωs<+ω1) is called as a low-speed rotation region below. In the low-speed rotation region, a counter electromotive voltage measuring operation is performed based on a signal from the measuring zone signal generating section 408 of FIG. 4.

When the rotational speed ωs output from the rotational speed the magnetic pole position estimating section 407 is in the low-speed rotation region, the measuring zone signal generating section 408 turns off all the switching elements SW1 to SW6 on a high side and a low side of three phases of the inverter 43 shown in FIG. 3. As a result, the connection between the inverter 43 and the motor M is cut off, and only a counter electromotive voltage generated in the motor M is enabled to be detected. That is to say, in an open zone where the motor M and the inverter 43 are cut off, a motor phase current does not flow and iα and iβ in Formula (3) are such that iα=iβ=0. As a result, Formula (3) is as Formula (10) below.

$$\begin{pmatrix} E\alpha \\ E\beta \end{pmatrix} = \begin{pmatrix} v\alpha' \\ v\beta' \end{pmatrix} \quad (10)$$

That is to say, counter electromotive voltages Eα and Eβ are obtained based on two-phase voltage signals vα' and vβ' obtained by three-phase to two-phase converting the detected three-phase voltage detection signals vv, vu and vw. In the open zone, since a PWM driving voltage is not applied from the inverter 43 to the motor M, Formula (10) represents that the weak counter electromotive voltage at the superlow rotation time can be detected.

FIGS. 8A and 8B are diagrams illustrating one example of open zone setting. In FIG. 8A, a horizontal axis represents time, and a vertical axis represents a state that a voltage is applied by the inverter 43. The state of "PWM driving application" in the voltage applying state represents a normal state that the switching elements SW1 to SW6 are driven into on/off by the PWM control signal based on the three-phase voltage command Vu, Vv and Vw from the two-phase to three-phase voltage converting section 405 in FIG. 4. On the other hand, the "cut-off" state is that all the switching elements SW1 to SW6 are turned off. The cut-off state is held in the open zone denoted by symbol T2. On the other hand, a normal PWM drive applying state is held in the PWM voltage applying zone at a (T1-T2) period.

That is to say, when the rotational speed ωs is the low-speed rotation region (−ω1<ωs<+ω1) and a command shown in FIG. 8A is input from the measuring zone signal generating section 408 of FIG. 4 into the PWM signal generating section 406, the PWM signal generating section 406 generates a PWM control signal based on the three-phase voltage commands Vu, Vv and Vw from the two-phase to three-phase voltage converting section 405 in the PWM voltage applying zone (T1-T1), and generates a control signal for turning off all the switching elements SW1 to SW6 in the open zone T2.

FIG. 8B is a diagram schematically illustrating a phase voltage to be detected in the PWM voltage applying zone and the open zone. In the PWM voltage applying zone, a voltage obtained by superimposing the counter electromotive voltage on a PWM modulation rectangular wave voltage to be applied by the inverter 43 is detected, but only the counter electromotive voltage that changes into a sine wave shape is detected in the open zone T2. Therefore, a voltage is detected in the open zone T2. A black circle in FIG. 8B indicates a detection timing. The voltage detection in the open zone T2 may be carried out at least at one point. Further, depending on a processing ability of an arithmetic element such as FPGA, but a detection may be carried out at a plurality of points in one open zone T2 so that the detected results may be averaged.

Figure 9:
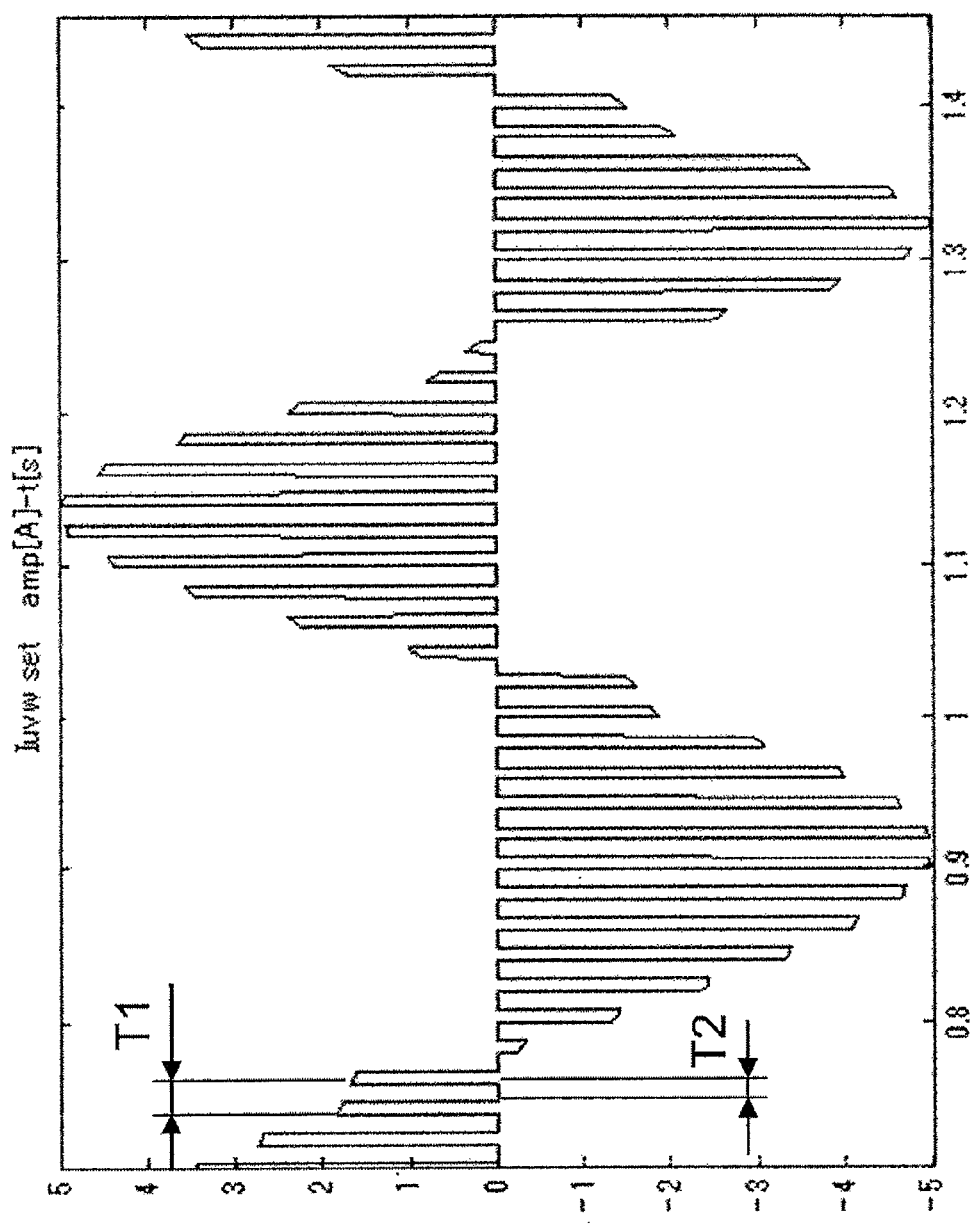
FIG. 9 is a diagram illustrating a current flowing in one phase of the motor at a time of open zone setting.

FIG. 9 is a diagram illustrating a current flowing in one phase of the motor M in a case where the command in FIG. 8A is output from the measuring zone signal generating section 408. The phase current is zero in the open zone T2, and flows only in the PWM voltage applying zone (T1–T2).

When the open zone T2 is provided in order to acquire the weak counter electromotive voltage information like this embodiment, the period (T1–T2) of the motor driving excitation by means of the inverter 43 is shortened by the open zone T2, and thus the starting time at the motor starting time (a time up to when the rotational speed rises from zero to +ω1) becomes long. On the contrary, when the open zone T2 is made to be too short in order to repress the extension of the starting time, a voltage at the voltage detecting time in the open zone T2 might include a transient response due to an influence of the PWM driving just before cutting-off, and a detection error of the counter electromotive voltage caused by the transient response becomes large. In order to repress this error, after a time that is more sufficient than a PWM carrier cycle Tpwm passes, a voltage should be detected.

For example, when a duration time of the cut-off state in the open zone T2 is denoted by T2 and a repetition cycle of the open zone is denoted by T1, the setting should be such that Tpwm<<T2<T1. For example, it is preferable that Tpwm is set to 20 μs to 100 μs, T1 is set to 1 ms to 100 ms, and T2 is set to 10% to 80% of T1. Further, in order to avoid the influence of the transient response as much as possible, as shown in FIG. 8B, it is desirable that a voltage is detected at a latter half of the open zone T2 (preferably, just before the end of the open zone T2).

In examples of FIGS. 8A and 8B, the PWM carrier cycle Tpwm=50 μs, the repetition cycle T1=20 ms, and the duration time of the open zone T2=4 ms. When a voltage is detected as shown in FIG. 8B, the repetition cycle T1 of the open zone is also a sampling period of a voltage data. In this case, the sampling cycle is 20 ms, but this is very longer than a sampling cycle of voltage data at a middle or high speed rotation time. The sampling cycle in the middle or high speed region is about 20 μs. However, since the motor rotation is also superlow speed rotation, even if the sampling cycle is 20 ms, no problem arises. Further, as a voltage detection timing in the open zone T2 where the influence of the transient response is avoided, a voltage may be detected in the latter half of the open zone T2, such as within 1 ms from the end time of the open zone T2(4 ms).

In this embodiment, as shown in FIGS. 8A and 8B, the open zone T2 is provided, and the counter electromotive voltage is calculated according to Formula (10) using voltage information detected in that open zone, but the counter electromotive voltage may be detected based on current information acquired in a state that the motor M is shorted-circuited. When motor three-phase wiring can be short-circuited instead of the provision of the open zone, an influence of a driving voltage from the inverter 43 to the motor M can be eliminated. This state can be held by the following short-circuit control based on a signal from the measuring zone signal generating section 408 in FIG. 4.

When the rotational speed ωs output from the rotational speed/magnetic pole position estimating section 407 is in the low-speed rotation region, the measuring zone signal generating section 408 makes only the three-phase switching elements SW1 to SW3 on the high side of the inverter 43 shown in FIG. 3 conductive (on), or makes only the switching elements SW4 to SW6 on the low side conductive (on). As a result, the connection between the inverter 43 and the motor M is cut off, the three-phase wiring of the motor M is short-circuited, and only the counter electromotive voltage generated in the motor M can be detected.

Figure 10:
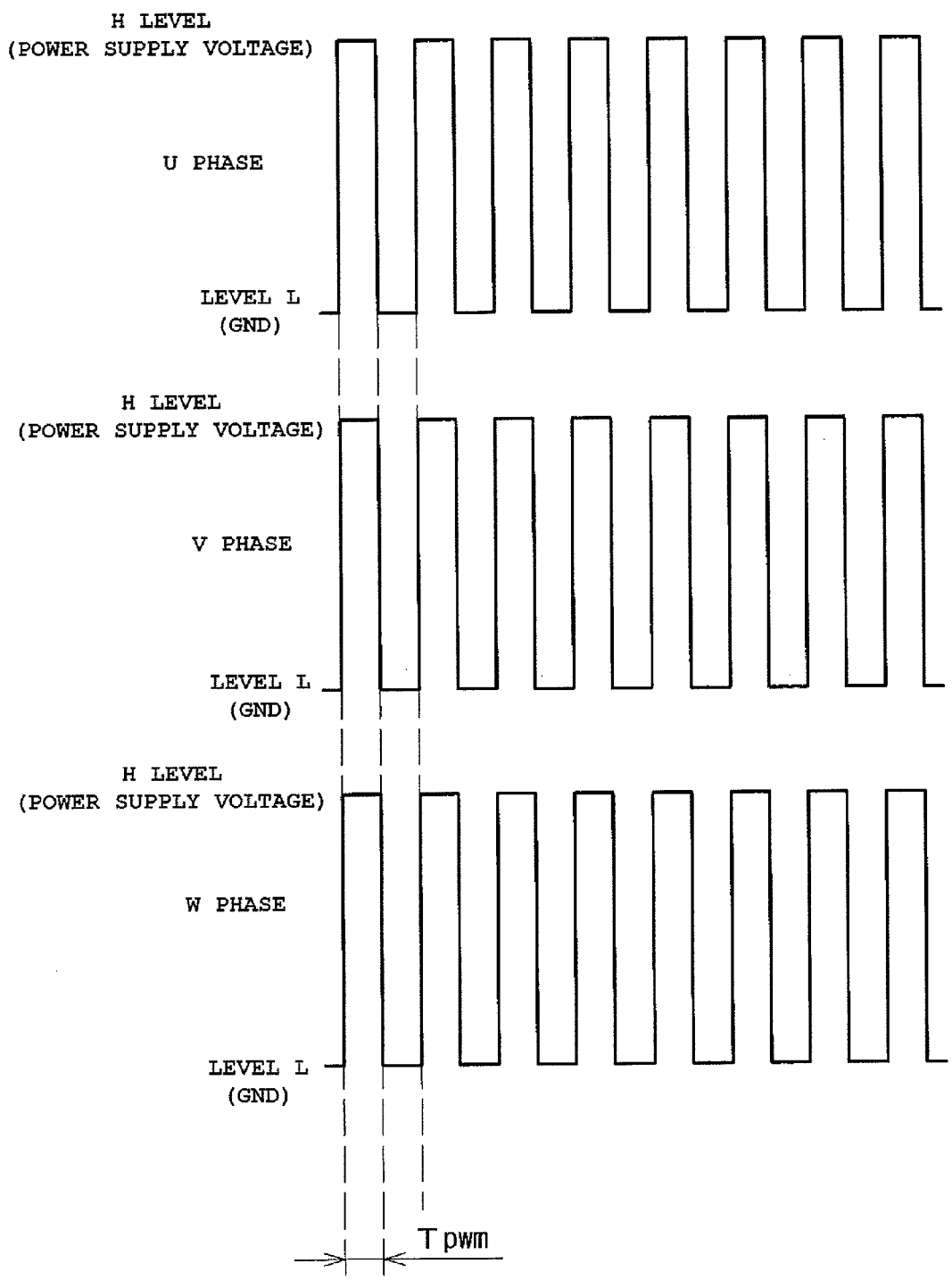
FIG. 10 is a diagram illustrating one example of a PWM voltage waveform in a short-circuited zone.

Further, the short-circuit control can be made in the following manner besides the above one. In the PWM driving, the voltage to be applied to the motor M is a rectangular wave voltage of H/L, and the short-circuit in this case corresponds to a case where all the three-phase voltages have the same duty and the H state and L state synchronize. Particularly the case of the sine wave drive is, as shown in FIG. 10, a case of driving with duty of 50%. In this case, the motor three-phase wiring is connected on the high side of the inverter 43 in the zone where all the three phases are H (power supply voltage), and the motor three-phase wiring is connected on the low side of the inverter in the zone where all the three phases are L (GND). In this case, electric potential of the three phases change simultaneously at every half cycle of the PWM carrier, and the three-phase connection is in a short-circuited state.

That is to say, a motor phase voltage does not rise and Vα=Vβ=0 in a short-circuited zone where the three-phase wiring of the motor M is brought into the short-circuited state by opening/closing the switching elements SW1 to SW6 of the inverter 43. In this case, a reactance component in an electrically equivalent circuit can be ignored due to low-speed rotation, and only a resistance component is considered to be present, and thus Formula (3) described above is as Formula (11) below.

$$\begin{pmatrix} E\alpha \\ E\beta \end{pmatrix} = -\begin{pmatrix} r & 0 \\ 0 & r \end{pmatrix}\begin{pmatrix} i\alpha \\ i\beta \end{pmatrix} \quad (11)$$

In the short-circuit zone, the current detecting section 50 detects phase current detection signals iv, iu, and iw, and converts them into two-phase current signals iα and iβ. Further, as shown in Formula (11), the current signals iα and iβ are multiplied by (−r) so that the counter electromotive voltages Eα and Eβ are obtained. In the short-circuit zone, since a PWM driving voltage is not applied from the inverter 43, a current does not flow from the inverter 43, and a weak current caused by only the faint counter electromotive voltage at the low-speed rotation is detected. As a result, the counter electromotive voltage can be detected according to Formula (11).

FIGS. 11A and 11B are diagrams illustrating one example of the short-circuited zone setting, and similar to the case of the open zone shown in FIGS. 8A and 8B (Tpwm=50 μs, T1=20 ms, T2=4 ms). In the short-circuited case, the inverter voltage applying state is a PWM drive applying state or a short-circuited state (the case where the duty is fixed to 50%). T2 denotes a duration time of the short-circuited zone, and T1 denotes a repetition cycle of the short-circuited zone. FIG. 11B illustrates a phase current. In the short-circuited zone, the phase current with a sine wave shape is generated only by the counter electromotive voltage, and the current is detected at a timing indicated by a black circle. On the other hand, a phase current flows in the PWM drive applying zone based on an applied voltage and the counter electromotive voltage.

Also in the case where a current is detected in the short-circuited zone, repetition cycle T1 of the short-circuited zone, duration times T2 in the short-circuited zone and the detection timing at T2 is set similarly to the case where a voltage is detected in the open zone. Since driving is carried out with the PWM duty of 50% in one example of the short-circuited zone shown in FIG. 10, an electric potential of the motor power three lines changes once in the half cycle of the PWM carrier cycle Tpwm between the H and L states as shown in FIG. 10. For this reason, from a viewpoint of pausing for a time as long as possible from the potential change timing, it is desirable that the detection timing is just before the end of the duration time T2 and just before the end of the PWM carrier cycle level L. As a representative example, the detection timing is preferably not more than 10 μs before the end time of the L state.

In this embodiment, the open zone or the short-circuited zone is repeatedly generated in the low-speed rotation region, and a three-phase voltage or a three-phase current of the motor M is detected in that zone, so that only counter electromotive voltage information as a faint signal is detected. As a result, the counter electromotive voltage information can be accurately detected, and the rotational speed and the magnetic pole electric angle can be estimated accurately based on the counter electromotive voltage.

—Second Embodiment—

In the first embodiment as described above, in order to accurately estimate the rotational speed ω and the magnetic pole electric angle θ in the low-speed rotation region (the region such that ω<ω1) where the rotation number is not more than tens of rps (for example, not more than 30 rps), the open zone and the short-circuited zone are provided so that a faint signal (voltage or current) is detected. However, even if such a measurement is performed, an increase in an estimation error cannot be avoided when the rotational speed is terminally close to zero (rotor stops).

In the second embodiment, therefore, a predetermined rotation number zone near the rotor stop where the estimation error increases is set as a forcible zone (−ωO≤ω≤+ωO) in advance, and when the value of the estimated rotational speed ω is within the forcible zone, means described below is employed in order to promote the positive rotation. Reference symbol ωO denotes a threshold with which the rotational speed ω can be estimated by the method of the first embodiment. For example, ωO is set to about 0.5 to 1 rps.

In the second embodiment, a rotational speed ωs and a magnetic pole electric angle θs in a rotational speed/magnetic pole position estimating section 407, and Id and Iq in an Id and Iq setting section 402 are set as follows. A process in measuring zone signal generating section 408 is executed similarly to the case of the first embodiment regardless of the value of the estimated rotational speed ω.

(a) Setting of Rotational Speed ωs (Rotational Speed to be Output)
ω<−ωO . . . ωs=ω (estimated rotational speed)
−ωO≤ω≤+ωO . . . ωs=ω2 (predetermined positive fixed value)
+ωO<ω . . . ωs=ω (estimated rotational speed)

(b) Setting of Magnetic Pole Electric Angle θs (Magnetic Pole Electric Angle to be Output)
ω<−ωO . . . θs=θ (estimated magnetic pole electric angle)
−ωO≤ω≤+ωO . . . θs=∫(ω2)dt
+ωO<ω . . . θs=θ (estimated magnetic pole electric angle)

(c) Id=0, Set Iq as follows.
Set ω<−ωO . . . Iq<0 (always deceleration driving)
Set −ωO≤ω≤+ωO . . . Iq<0 (a driving direction is indefinite)
Set +ωO<ω . . . Iq<0 (in a case of a deceleration command)
Iq>0 (in a case of an acceleration command)

(In the Case of +ωO<ω)

When the rotational speed ω estimated by the rotational speed/magnetic pole position estimating section 407 is within this range, the rotational speed/magnetic pole position estimating section 407 outputs the estimated rotational speed ω as the rotational speed ωs, and outputs the estimated angle θ as the magnetic pole electric angle θs. In this case, since the positive rotation (+ωO<ω) is estimated, the Id and Iq setting section 402 sets Iq<0 so that the rotational speed is reduced in the case of the deceleration command. On the contrary, Iq>0 is set so that the rotational speed is heightened in the case of the acceleration command.

(In the Case of −ωO≤ω≤+ωO)

When the rotational speed ω is in a forcible zone (−ωO≤ω≤+ωO), the error is large, reliability of the estimated values is very low, and thus proper estimation cannot be carried out. For this reason, when a current is set based on the estimated rotational speed ω, a motor rotational speed might be retained in −ωO≤ω≤+ωO. In this embodiment, therefore, regardless of the estimated value ω, a rotating magnetic field is forcibly formed by a predetermined constant rotational speed ω2, and even when a motor rotational direction is any of the positive rotation and reverse rotation, a quick shift from the forcible zone (−ωO≤ω≤+ωO) to the outside of the forcible zone where estimation can be carried out based on the counter electromotive voltage is enabled.

For this reason, the rotational speed/magnetic pole position estimating section 407 outputs a constant value ω2 (ω2>0) as a rotational speed instead of the estimated rotational speed ω. That is to say, the ω generating section 4115 in FIG. 6 multiplies input $\Delta\Psi m+\Delta\Psi=2\omega r\cdot T$ by 0.5, and divides the multiplied value by a time T1 so as to estimate the rotational speed ω. However, when the estimated ω is such that −ωO≤ω≤+ωO, ω2 is output as the rotational speed ωs.

In this case, a magnetic pole position of a motor rotor is indefinite, and in order to make a starting torque securely act in this condition, it is preferable that a time for which a phase of the rotating magnetic field generated by a motor stator is present on a suitable position (the phase leads by 90° with respect to an N pole of the motor rotor) is sufficiently secured. From such a viewpoint, in order to change the phase position slowly, it is normally effective that ω2 is set to a value smaller than ω0. For example, when ωO=2π·0.5 [rad/S], the setting is such that ω2=2π·0.25 [rad/S]. Naturally, the value of ω2 is not limited to this, it may be set so that ωO≤ω2.

Further, since the motor M is forcibly rotated regardless of a magnetic pole position, a correcting amount Δφ arithmetic section 4077 outputs Δφ=0 as a magnetic pole phase shift correcting amount Δφ regardless of a phase angle Ψ to be input from a phase angle arithmetic section 4076. Therefore, the magnetic pole electric angle θs is such that θs=∫(ω2)dt. Further, as to the setting of Iq in the Id and Iq setting section 402, a driving direction is indefinite, but the setting is such that Iq<0. In the forcible zone, when a current setting for always maintaining deceleration (regardless of a sign of the rotational speed, rotational speed is made to be close to zero) is made, the rotation is prevented from being retained near upper and lower thresholds in the forcible zone, and an opportunity of quick shifting to the positive rotational direction can be increased.

(In the Case of ω<−ωO)

When ω<−ωO, the method of the first embodiment is used so that the rotational speed can be estimated. For this reason, the ω generating section 4115 outputs the estimated rotational speed ω as ωs=ω. Also as to the setting of the magnetic pole electric angle θs, the magnetic pole electric angle (θ=∫(ωs) dt+Δφ) calculated by using the magnetic pole phase shift correcting amount Δφ estimated by the correcting amount Δφ arithmetic section 4077, and the rotational speed ωs to the magnetic pole electric angle θs. Further, since ω<−ωO represents the reverse rotation, in application to the vacuum pump, the setting is made such that Iq<0 in the Id and Iq setting section 402 so that deceleration driving is always carried out. FIG. 12 is a diagram illustrating a relationship between an estimated rotational speed ω and Iq setting.

As described above, in the second embodiment, when the estimated rotational speed ω is in the forcible zone (−ωO≤ω≤+ωO), the setting is such that ωs=ω2, θs=∫(ω2)dt and Iq<0 regardless of the estimated rotational speed and the magnetic pole electric angle so that the motor M is forcibly driven. The rotational speed is controlled so as to be quickly out of the forcible zone, and thus the positive rotation of the motor can be promoted. Further, also when the rotation is estimated as the reverse rotation (ω<−ωO), the setting is such that Iq<0, so that the reverse rotating state is quickly inverted to the positive rotational direction.

In a case of the constitution of the vacuum pump shown in FIG. 1 where the rotor unit R is magnetically levitated by the magnetic shaft device, as disclosed in JP 2011-231760 A, the rotating magnetic field is also generated in a magnetic bearing electromagnet, so that the rotor unit R provided with the motor rotor 11 can be forcibly rotated to the positive direction.

Figure 13:
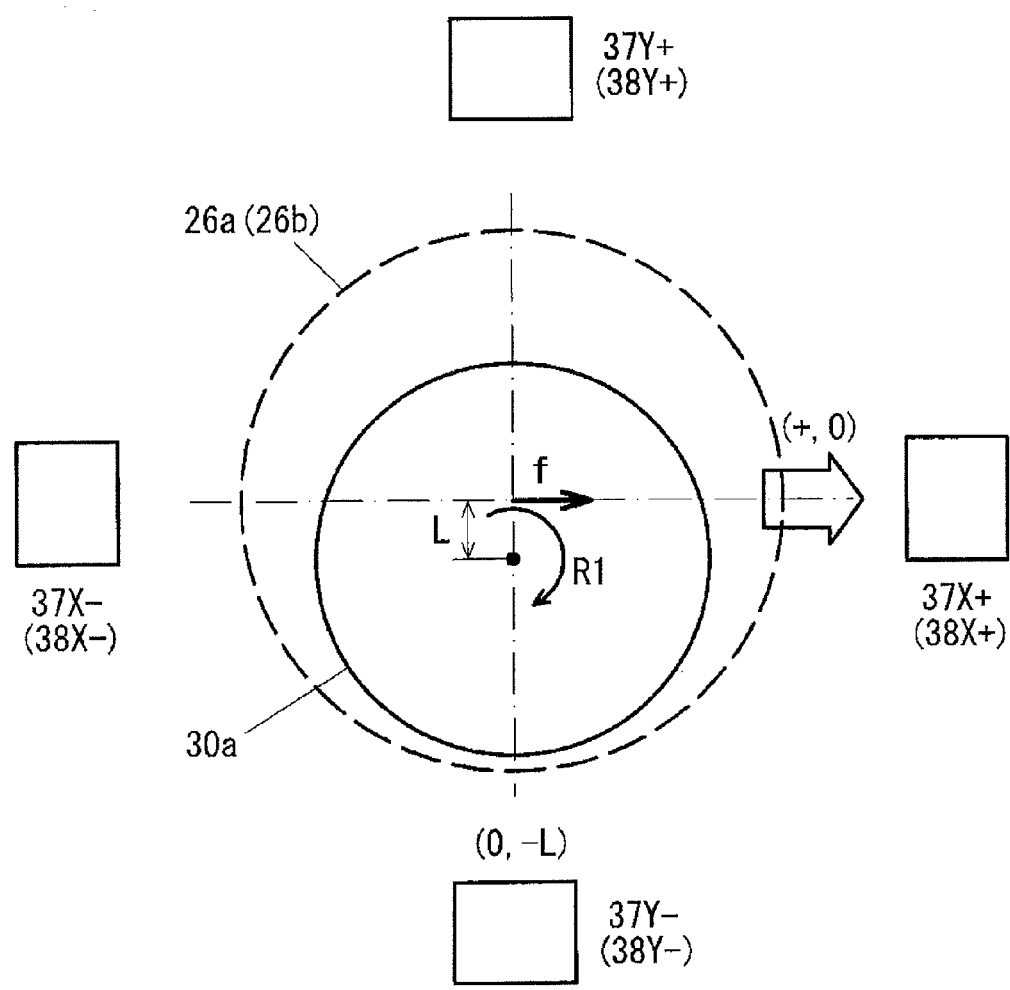
FIG. 13 is a diagram illustrating positions of electromagnets of a magnetic bearing and a shaft viewed from an axial direction.
Figure 14A:
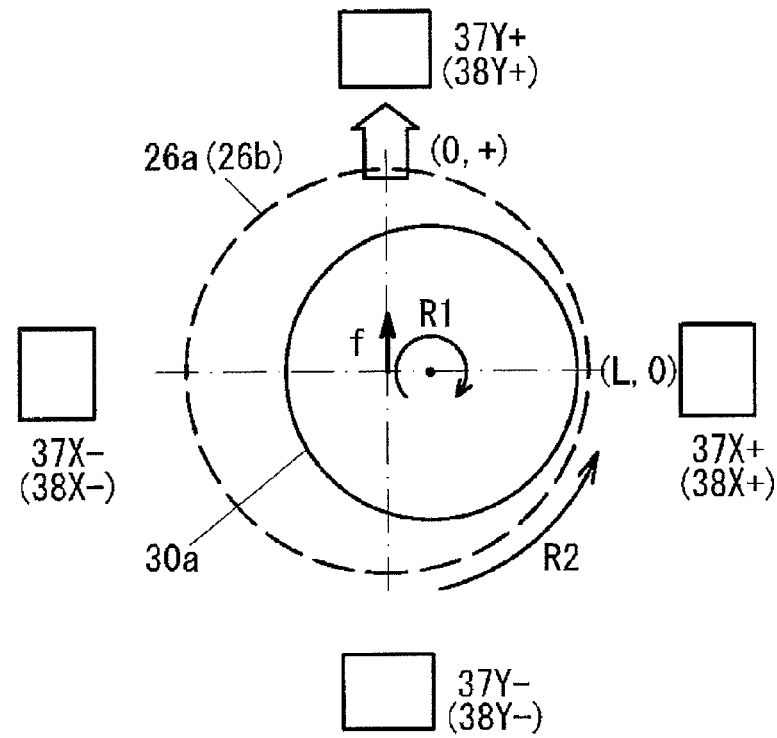
FIGS. 14A and 14B are diagrams describing a starting operation and illustrates an operation subsequent to FIG. 13.
Figure 14B:
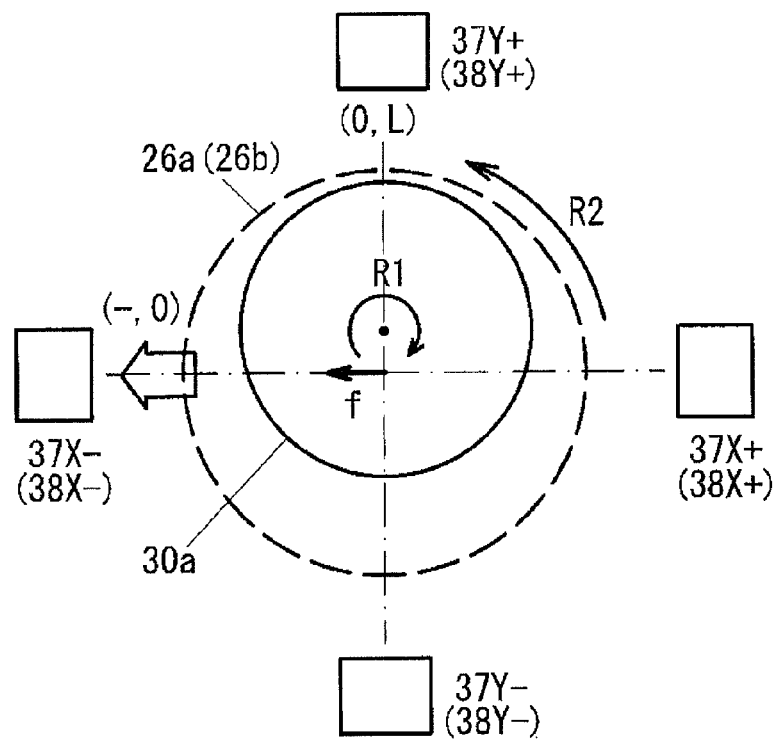
Figure 15:
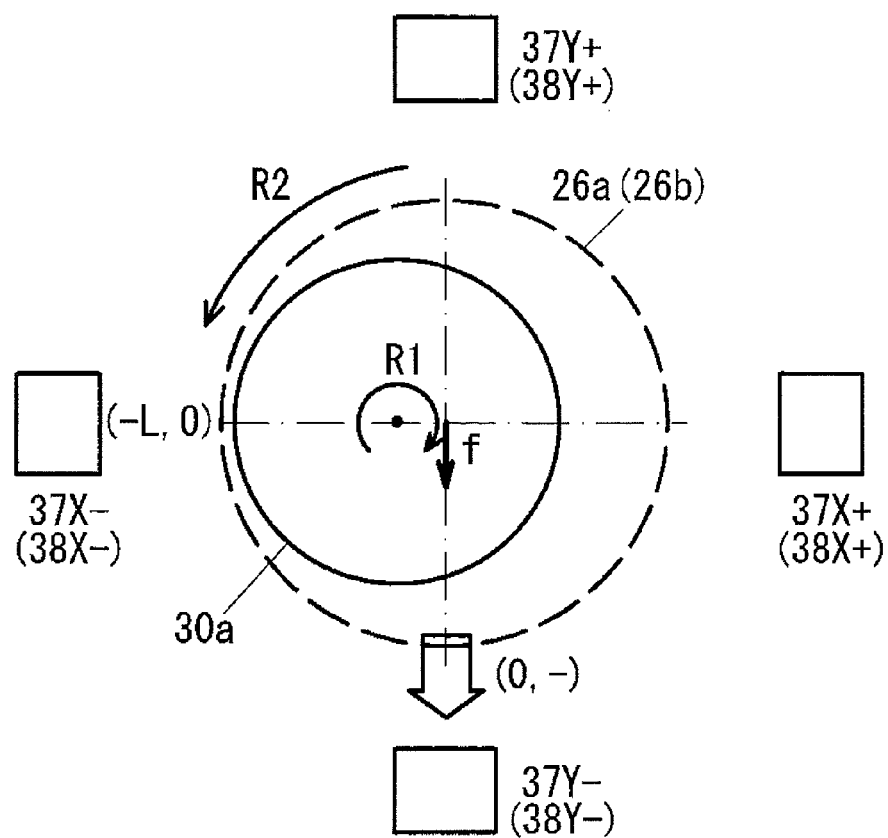
FIG. 15 is a diagram describing the starting operation and illustrates an operation subsequent to FIG. 14.

FIGS. 13 to 15 are diagrams schematically describing the positive rotation driving of the rotor unit R using attraction forces of magnetic bearings 37 and 38. FIG. 13 is a diagram illustrating positions of electromagnets 37x and 37y of the magnetic bearing 37 and a shaft 30a viewed from an axial direction. In FIG. 13, the electromagnets 37x and 37y arranged on the plus side of a coordinate axis are denoted by reference symbols 37x+ and 37y+, and the electromagnets 37x and 37y arranged on the minus side are denoted by 37x− and 37y−. Electromagnets 38x and 38y of the radial magnetic bearing 38 on the lower side are also arranged similarly to the case of the electromagnets 37x and 37y, and are denoted by similar symbols in parentheses. A circle indicated by a broken line denotes inner peripheral positions of mechanical bearings 26a and 26b. A moving range of the shaft 30a in a radial direction is limited within the circle indicated by the broken line by the mechanical bearings 26a and 26b.

When the rotor unit R is allowed to rotate in the positive rotational direction by using the attraction forces of the magnetic bearings 37 and 38, the position of the shaft 30a starts from a position shown in FIG. 13, for example. In this case, an axial magnetic bearing 39 is controlled similarly to a normal case, and the shaft 30a levitates in an axial direction (z axial direction). On the other hand, as to the radial magnetic bearings 37 and 38, a resultant force of the attraction forces on the opposed pulse side and minus side is zero in the electromagnets 37x and 38x in an x axial direction, and the shaft 30a is attracted to a y-axis minus direction in the electromagnets 37y and 38y in a y axial direction. A position of the shaft 30a at this time is (0,−L) where the center axes of the radial magnetic bearings 37 and 38 are origins. The shaft 30a is on the position that does not contact with the mechanical bearings 26a and 26b.

In the position state shown in FIG. 13, the resultant force of the attraction forces of the electromagnets 37y+ and 37y− is reduced to zero, and the electromagnets 37x+ and 37x− are controlled so as to generate attraction forces (+, 0) of the x-axial plus direction for attracting the shaft 30a to the electromagnet 37x+. Sign "+" of the attraction force (+, 0) indicates that the attraction force in the x axial direction has the plus direction, and "0" indicates that the electromagnets 37y+ and 37y− in the y axial direction are controlled to be reduced and the attraction force in the y axial direction is zero. Only the operations of the electromagnets 37x and 37y of the magnetic bearing 37 are described, but the magnetic bearing 38 is controlled similarly to the case of the magnetic bearing 37. The same is true on the following description.

When the attraction force (+, 0) of the x-axial plus direction acts on the shaft 30a being eccentric from the center of the magnetic bearing to the position (0, −L) as shown in FIG. 13, the shaft 30a is attracted to the electromagnet 37x+, and a moment M=f·L acts so that the shaft 30a rotates in a direction of Arrow R1(the positive rotational direction). The rotation in the direction R1 is called as forward rotation below. When the positive rotational direction is opposite, namely, a −R direction, the attraction force (−, 0) of an opposite direction may be generated.

When the position of the shaft 30a is on the position (L, 0) shown in FIG. 14A due to the attraction force (+, 0), the electromagnets 37x+ and 37x− are controlled so that a resultant force of the attraction forces is made to be zero. Further, the electromagnets 37y+ and 37y− are controlled so as to generate the attraction force (0, +) of the y-axis plus direction that attracts the shaft 30a to the electromagnet 37y+. When the position of the shaft 30a is the position (0, L) shown in FIG. 14B, the electromagnets 37y+ and 37y− are controlled so that the resultant force of the attraction forces is made to be zero, and the electromagnets 37x+ and 37x− are controlled so as to generate the attraction force (−, 0) of the x-axis minus direction that attracts the shaft 30a to the electromagnet 37x−.

Further, when the position of the shaft 30a is a position (−L, 0) shown in FIG. 15, the electromagnets 37x+ and 37x− are controlled so that the resultant force of the attraction forces is made to be zero, and the electromagnets 37y+ and 37y− are controlled so as to generate the attraction force (0, −) of the y-axis minus direction that attracts the shaft 30a to the electromagnet 37y−.

When the attraction forces are generated in order of (+, 0)→(0,+)→(−, 0)→(0, −) so that the rotating magnetic fields are generated by the radial magnetic bearings 37 and 38, the shaft 30a makes a revolving (whirling) motion R2, which is an opposite rotation to the positive rotational direction, about a magnetic bearing, namely, the backward revolving motion R2. As shown in FIGS. 13 to 15, the central axis of the shaft 30a in the revolving motion shifts from the central axes of the radial magnetic bearings 37 and 38. Further, in the rotating magnetic fields from the radial magnetic bearings 37 and 38, since the rotation phase leads by 90 deg with respect to the revolving motion R2, a moment of the rotational direction always acts on the shaft 30a. For this reason, the shaft 30a starts not only the backward revolution but also the forward rotation. When the rotational driving using the magnetic bearings 37 and 38 is stopped, the revolving motion R2 stops, and only the rotating motion of the positive rotational direction remains.

Figure 16:
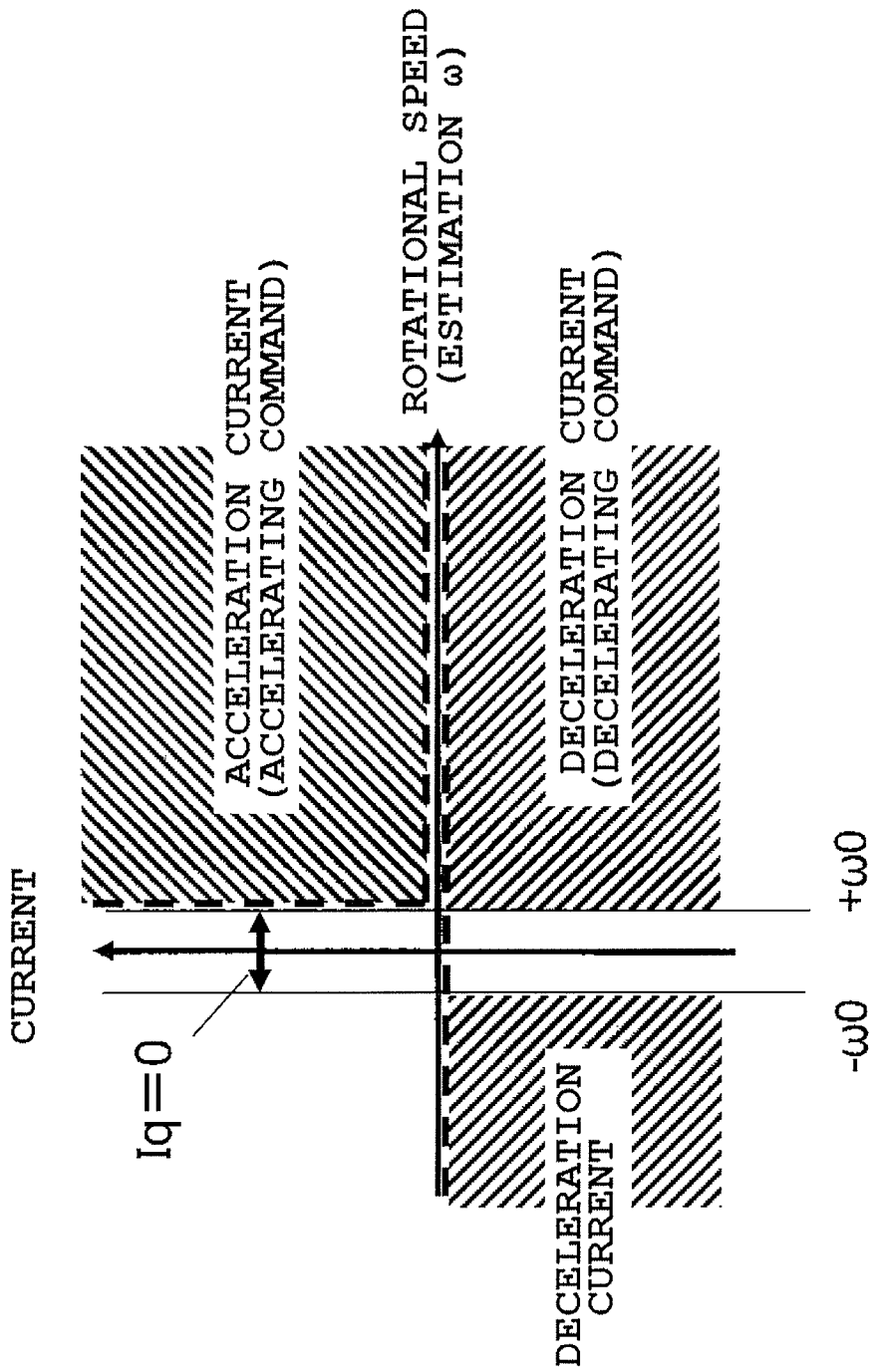
FIG. 16 is a diagram illustrating a relationship between the estimated rotational speed and the Iq setting in a case where forcible rotation drive is carried out by the magnetic bearing electromagnet.

FIG. 16 is a diagram illustrating a relationship between the estimated rotational speed ω and the Iq setting in a case where forcible rotation drive is carried out by the magnetic bearing electromagnets. In the forcible zone (−ωO≤ω≤+ωO), since the forcible drive is carried out by the magnetic bearing electromagnet, the setting is such that Iq=0. Further, in the forcible zone, the measuring zone signal generating section 408 outputs a signal of the open zone setting. In this case, since the driving by means of the motor M is not carried out, the setting is such that T1=T2 so that all the forcible zones are the open zones. For this reason, in the forcible zone, only the counter electromotive voltage is always detected.

—Third Embodiment—

In the first and second embodiments as described above, in order to reduce a bad influence of a driving voltage component from an inverter 43, as shown in FIGS. 8A, 8B, and 11, an open zone (or a short-circuited zone) is provided periodically in a low-speed rotation region (−ω1<ω<+ω1). However, since a current for driving the motor does not flow in the open zone and the short-circuited zone from the inverter 43, accordingly a driving ability is deteriorated so that an activating time after the starting becomes long.

Figure 17:
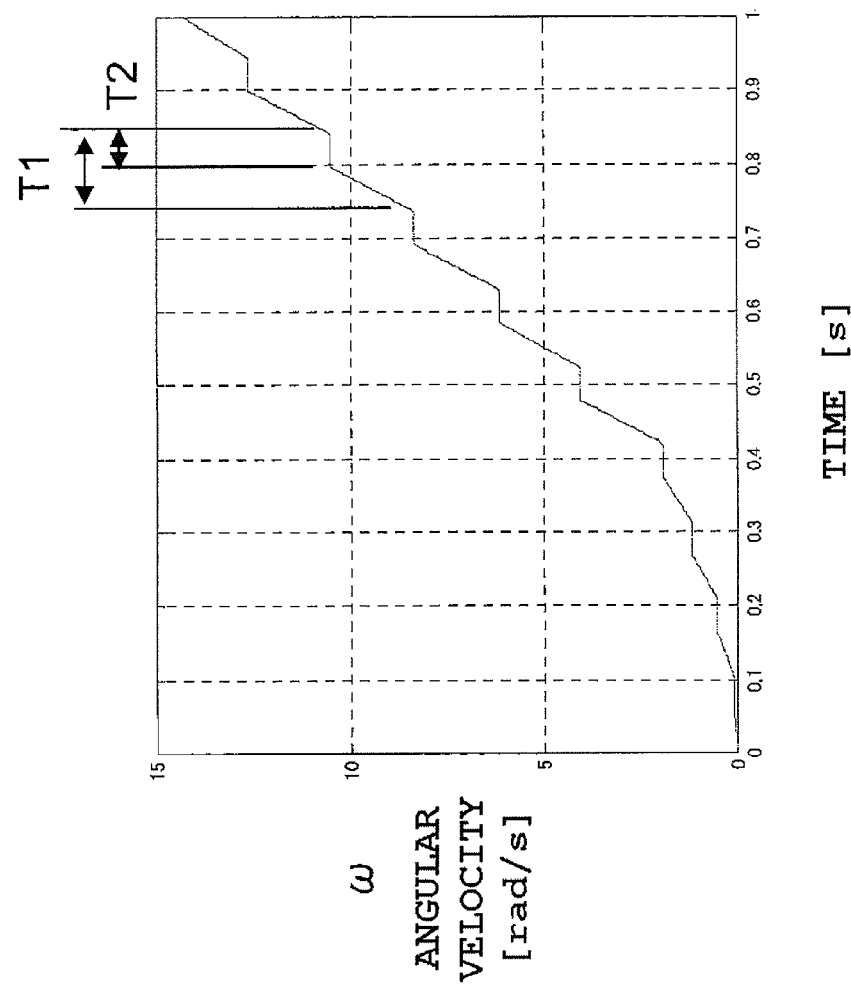
FIG. 17 is a diagram illustrating an example of an accelerating operation in a case where an open zone T2 is repeated in a cycle T1 at the starting time, and illustrates a case where rotation resistance is weak.
Figure 18:
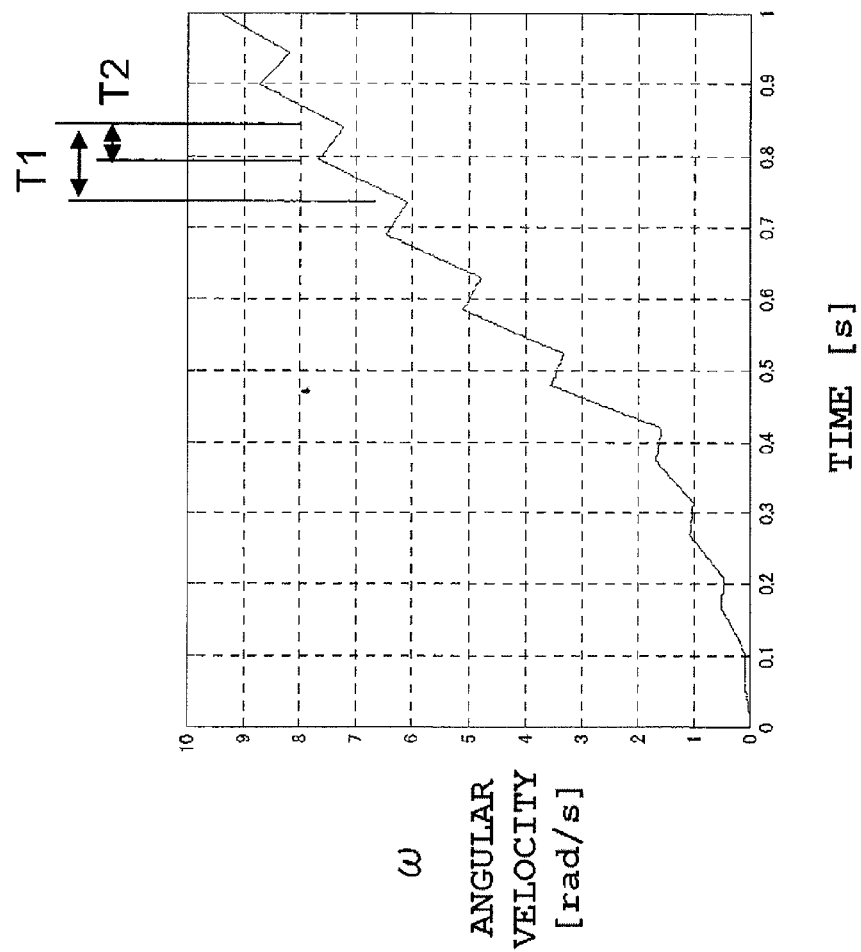
FIG. 18 is a diagram illustrating an example of the accelerating operation in the case where the open zone T2 is repeated in the cycle T1 at the starting time, and illustrates a case where rotation resistance is strong.

FIGS. 17 and 18 are diagrams illustrating an accelerating operation in a case where the open zone T2 is repeated in the cycle T1 at the starting time. FIG. 17 illustrates a case where a rotational resistance is small, and FIG. 18 illustrates a case where the rotational resistance is large. When the rotational resistance is large, the rotational speed is lowered in the open zone T2 and the activating time is remarkably long. For this reason, a ratio of the open zone T2 to the cycle T1 should be small. When the ratio of the open zone T2 is set to be too small, a detection error becomes large because of an influence of a transient response at the detection timing just after the open (or short-circuit). Particularly at the rotational speed near the rotor stop, the counter electromotive voltage signal is faint, and its influence is noticeable.

Figure 19:
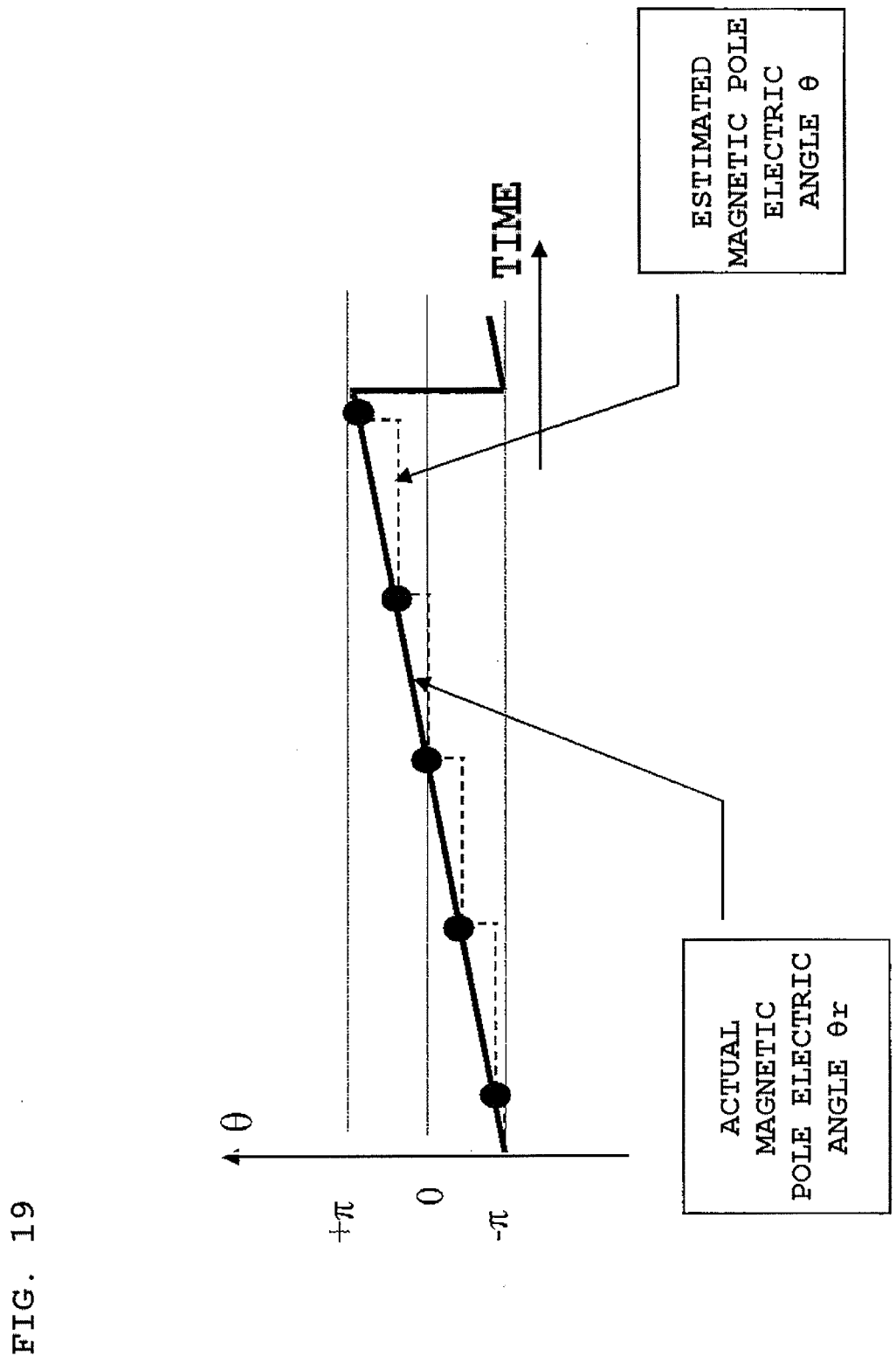
FIG. 19 is a diagram illustrating a relationship between an estimated magnetic pole electric angle and an actual magnetic pole electric angle.

Further, since an estimating operation is discretely performed by the T1 cycle sampling based on the signal detected in the cycle T1, the T1 cycle should be enough shorter than the rotor rotating period. For this reason, concretely operated results at least at five or more points as detection points indicated by black circles in FIGS. 8A and 8B are necessary for the one rotational cycle (±π). FIG. 19 is a diagram illustrating a relationship between an estimated magnetic pole electric angle θ and an actual magnetic pole electric angle θr. In FIG. 19, the black circle denotes the detection point, a solid line denotes the actual magnetic pole electric angle θr, and a broken line denotes the estimated magnetic pole electric angle θ. However, when the cycle T1 remains constant, the number of sampling points at one cycle decreases as the rotational speed increases, and thus it is difficult to generate an electric angle.

In the third embodiment, when the measuring zone signal generating section 408 sets T1 and T2, T1 and T2 are set as follows with T1 and T2 being non-constant in the rotation region where the rotational speed ωs is between 0 to ω1. As a result, acceleration or deceleration is smoothly carried out based on a motor rotation signal (voltage or current signal).

First, in the rotational region where the rotational speed ωs is between 0 to ω1, in order to generate the magnetic pole electric angle θs accurately, the measuring zone signal generating section 408 decreases T1 and T2 at a plurality of stages in accordance with the rise in the rotational speed ωs. Naturally, T1 and T2 may be continuously reduced in accordance with the rise in the rotational speed ωs. Further, T2 is set to be longer as the rotational speed ωs decrease in order to accurately detect the counter electromotive voltage that is proportional to the rotational speed. For example, in a case of the change at the three stages such as T1(A)→T1(B)→T1(C) and T2(A)→T2(B)→T2(C) while the rotational speed ωs changes from 0 to ω1, the setting is such that T1(A)>T1(B)>T1(C) and T2(A)>T2(B)>T2(C).

Figure 20A:
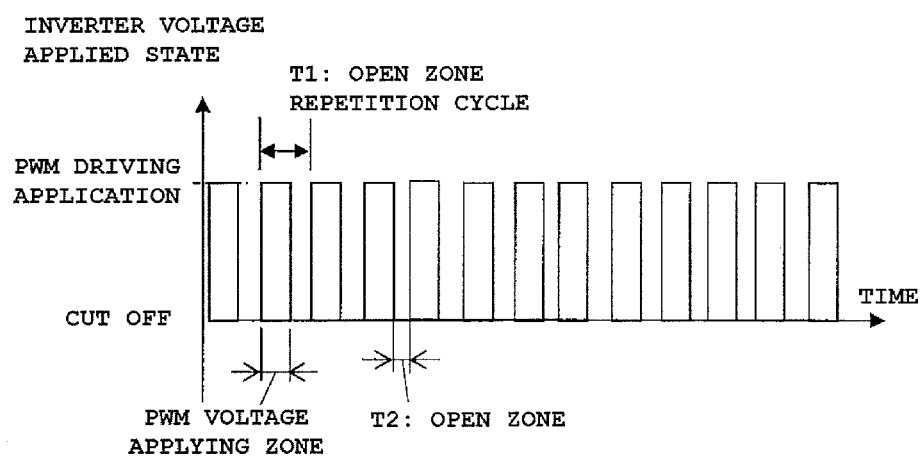
FIGS. 20A, 20B and 20C are diagrams illustrating one example of change of T1 and T2.
Figure 20B:
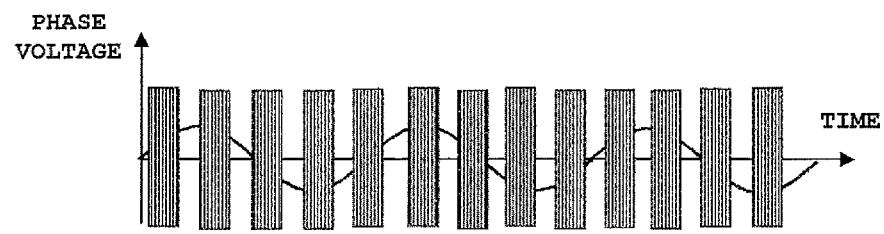
Figure 20C:
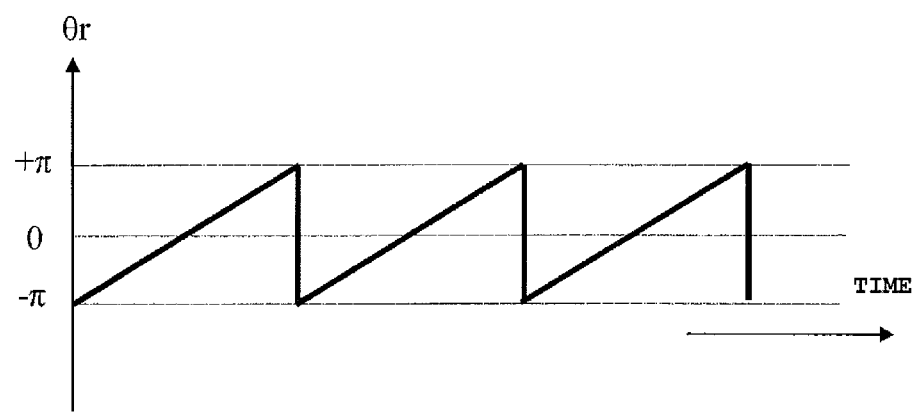

FIG. 20 is a diagram illustrating one example of change of T1 and T2. FIG. 20 illustrates a state that the rotational speed ω increase three times as high as the case shown in FIGS. 8A and 8B. The cycles T1 and T2 are set to be ⅓ according to the triple increase in the rotational speed. For this reason, the number of detection points can be equal to the case of FIGS. 8A and 8B, and the operation accuracy of the rotational speed and the magnetic pole electric angle can be maintained at an equivalent level.

For example, when not a non-contact support type magnetic bearing but a contact-support type ball bearing is employed as a bearing for supporting a pump rotor in a rotational state, the rotational resistance of the pump rotor increases. In general, as the rotational speed of the pump rotor increases, a deceleration torque function increases. The pump rotor is decelerated by the deceleration torque function in the T2 zone where the driving torque does not act (the open zone), and the pump rotor is accelerated by a driving torque from which the deceleration torque is subtracted, in the driving zone other than T2(T1−T2).

The influence of the resistance is described by using an approximate expression as follows. An equation of motion of a rotor rotation system is expressed by Formula (12) below. Symbol Ip denotes a polar moment of inertia in the pump rotor, symbol ω denotes the rotational speed, symbol c denotes a constant of proportionality of the deceleration torque caused by deceleration, symbol Tt denotes a rotational driving torque that is proportional to a q-axial current, and symbol Tr denotes the deceleration torque caused by a factor other than the speed.

$$Ip \times (d\omega/dt) + c \times \omega = Tt - Tr \qquad (12)$$

Since the driving torque Tt=0 in the open zone T2(q-axial current=0), a deceleration Δωd is approximately expressed by Formula (13) below.

$$\Delta\omega d = \{(Tr + c \times \omega)/Ip\} \times T2 \qquad (13)$$

On the other hand, in a non-open zone (q-axial current≠0) of the zone (T−T2), acceleration part Δωu is expressed by Formula (14) below. The acceleration capable condition is here such that Δωu>Δωd.

$$\Delta\omega u = \{(Tt - Tr - c \times \omega)/Ip\} \times (T1 - T2) \qquad (14)$$

The acceleration capable condition is here such that Δωu>Δωd, and a relationship that Tt−Tr−c×ω>(T2/T1)×Tt should be satisfied by Formula (13) and Formula (14). Further, since (T2/T1)×Tt>0, at least the driving torque Tt should be large (namely, the q-axial current value is large) so that Tt>(Tr+c×ω), but when a motor q-axial current cannot be large, the driving zone (T1−T2) is lengthened, namely, the open zone T2 should be shortened.

Figure 24:
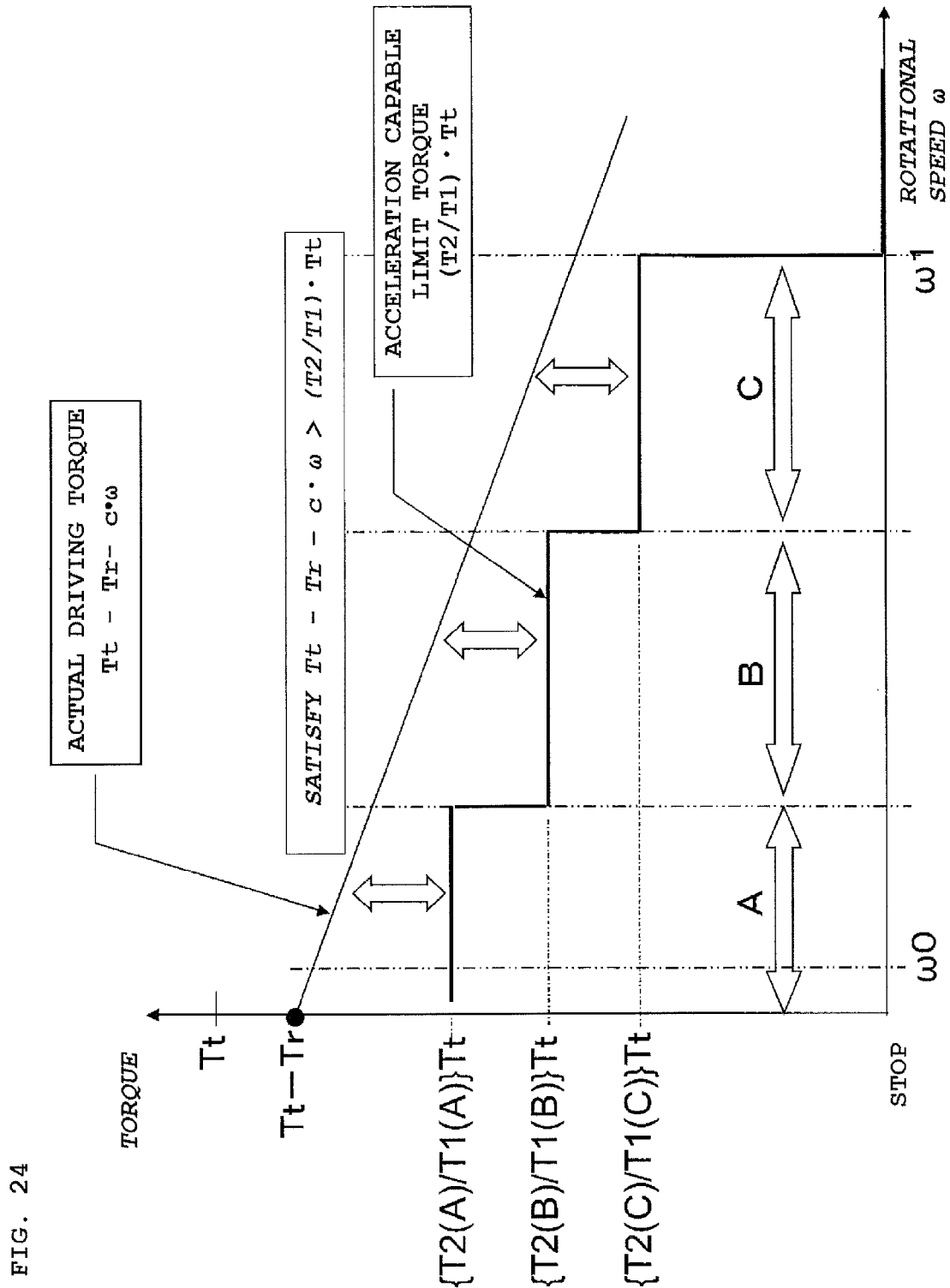
FIG. 24 is a diagram illustrating an example of T2/T1 that satisfies an acceleration capable condition.

In general, the motor current with a value close to an allowable current value is applied regardless of the rotational speed in order to shorten the activating time, but as the rotational speed ω increases, an actual driving torque part (Tt−Tr−c×ω) contributed to the acceleration is decreased. For this reason, in order to compensate this, it is effective that a ratio of T2 zone to the cyclic time T1 is lowered, and a torque part (T2/T1)Tt of an acceleration capable limit is reduced. This can be further clarified by, as shown in FIG. 24, applying the setting of T1 and T2 at the three stages A, B and C to a right side of an inequality expression Tt−Tr−c×ω>(T2/T1)×Tt of the acceleration capable condition, and illustrating an inequality relationship with a left side that is the actual driving torque part with Tt, Tr and c being constant (FIG. 24).

—Fourth Embodiment—

Figure 21:
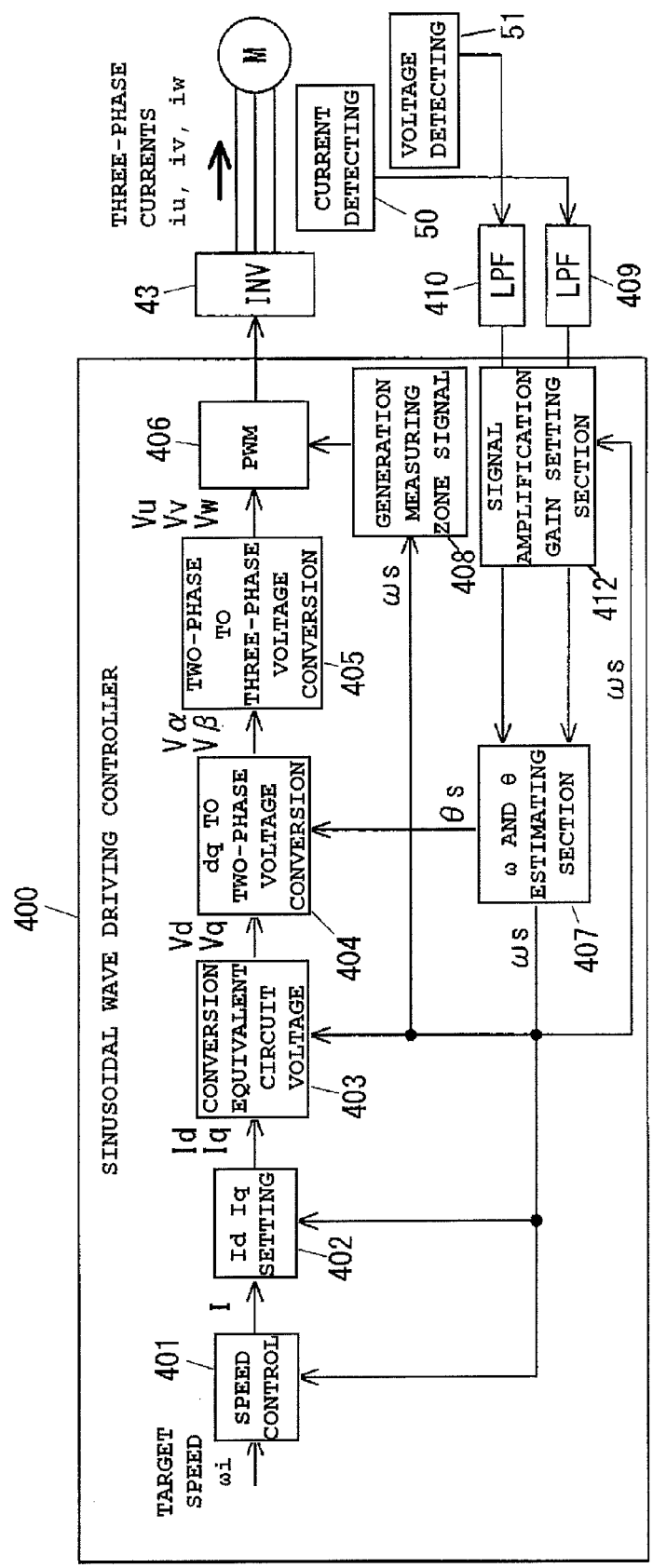
FIG. 21 is a block diagram describing the sinusoidal wave driving controller according to a fourth embodiment.

FIG. 21 is a block diagram describing a sinusoidal wave driving controller 400 according to a fourth embodiment. In the fourth embodiment, a signal amplification gain setting section 412 shown in FIG. 21 is further provided, and gain switching control, described below, is further added to the constitution in the third embodiment.

Since a motor voltage (or current) signal value caused by the counter electromotive voltage that is detected by an open zone (or the short-circuited zone) is proportional to the rotational speed, this signal value is extremely small near the still state and its detecting accuracy is essentially unsatisfactory. For this reason, an amplification degree should be set to be higher at a stage of a detected analog signal. On the other hand, it is not suitable for a signal whose signal level is not faint and that is detected at the latter half of the rotational speed region ($-\omega 1 < \omega s < +\omega 1$) to set the amplification degree to a larger value due to restraint of a dynamic range of an AD converter and an amplifier.

The signal amplification gain setting section 412 includes an amplifying section and an amplification gain switching section, and switches an amplification gain depending on rotational speed in the zone where $-\omega 1 < \omega s < +\omega 1$. For example, similarly to the case of the switching of T1 and T2, the amplification degree is reduced at a plurality of stages in accordance with the rise in the rotational speed. Alternatively, when the amplification degree is increased near the still state where $-\omega 1 < \omega s < +\omega 1$ so that a predetermined rotational speed is obtained, and then the amplification degree is decreased. In such a manner, the amplification degree may be changed at two stages. Further, when T1 and T2 are switched in stages, in consideration of management of an operating condition and a transient response at the switching time, in order to prevent a useless increase in the number of the operating conditions according to cases, the switching timing of the amplification gain may be the same as the switching timing of the T1 and T2 zones. The case where a combined use of the switching of the T1 and T2 zones has been described here, but the present invention can be applied also to a case where T1 and T2 are constant, and a similar effect is produced. Further, in order to prevent chattering at the switching time, a rotational speed threshold of the switching timing may be changed according to the acceleration and the deceleration, or a hysteresis may be provided.

Figure 22:
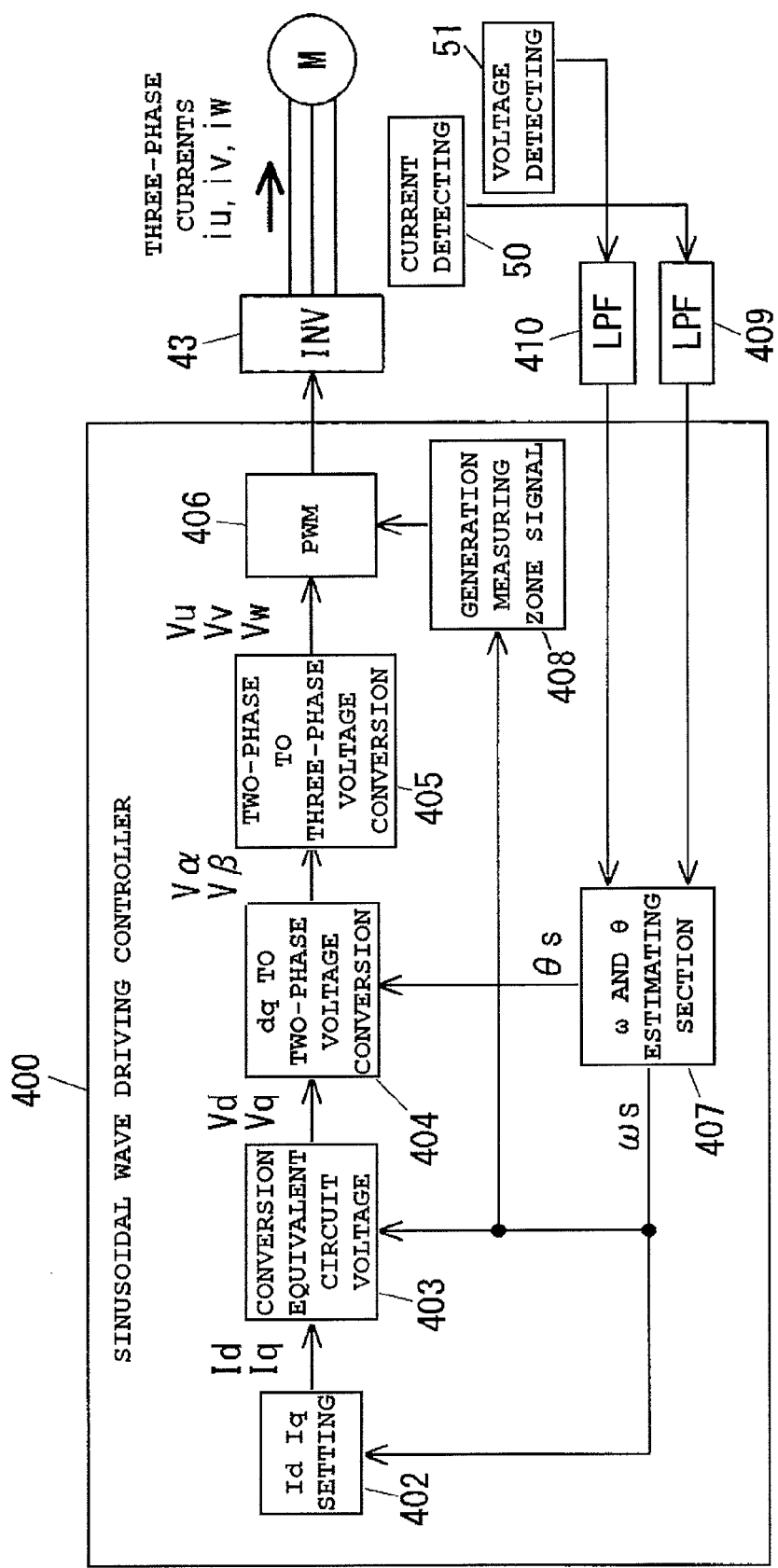
FIG. 22 is a block diagram illustrating a constitution in a case where the sinusoidal wave driving controller is a closed a closed loop control system.

The sinusoidal wave driving controller 400 shown in FIGS. 4 and 21 employs a constitution of speed feedback control. That is to say, a level of set current I is output by P control (proportional control) and PI control (proportional control and integral control) based on a difference between the rotational speed $\omega s$ and the target speed $\omega$. The role of the control in the low-speed rotation region is an interface between acceleration from the still state to a predetermined rotation number ($\omega 1$) of the positive rotation and a middle or high speed range operation, and in a case of deceleration from the rated rotation in the high range, the deceleration in the middle or high speed range is taken over and the deceleration further proceeds until the rotor stops. For this reason, control for converging to a specified target rotation number is not necessary. Therefore, as shown in FIG. 22, a closed loop control system where the setting current is constant may be used.

—Fifth Embodiment—

Further, in the first to fourth embodiments as described above, the on/off state of switching elements SW1 to SW6 of an inverter 43 is controlled so that an open zone or a short-circuited zone is generated and a cut-off zone (T2) is formed. However, the method for generating the cut-off zone (T2) is not limited to this, and a switch is provided to a power line between the inverter 43 and a motor M so that an open state or a short-circuited state may be generated. Since a difference between the fifth embodiment and the first to fourth embodiments is only a generating mechanism of the open zone and the short-circuited zone, only the operation for generating the open zone and the short-circuited zone is described below.

Figure 23:
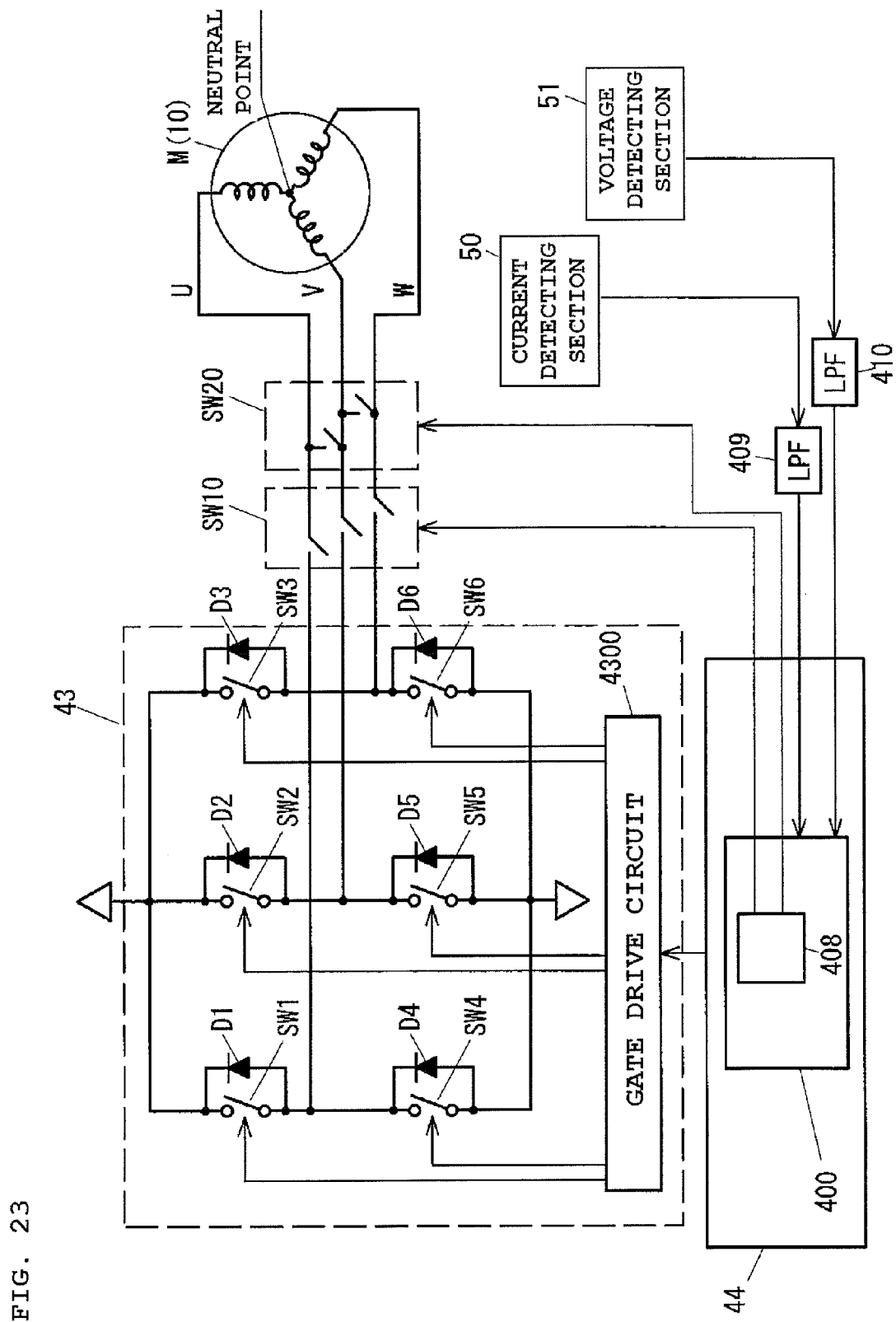
FIG. 23 is a diagram illustrating a fifth embodiment.

FIG. 23 is a diagram illustrating the fifth embodiment. In FIG. 23, an opening switch group SW10 and a short-circuiting switch group SW20 are further provided to the constitution shown in FIG. 3. Switches for opening three-phase coils (a U-phase coil, a V-phase coil, and a W-phase coil) are provided to the opening switch group SW10. A switch for short-circuiting the U-phase coil and the V-phase coil, and a switch for short-circuiting the V-phase coil and the W-phase coil are provided to the short-circuiting switch group SW20.

When the open zone in the first embodiment is generated, all the three switches of the opening switch group SW10 are opened. Further, when the short-circuited zone is generated, all the three switches of the opening switch group SW10 are opened and then the two switches of the short-circuiting switch group SW20 are short-circuited.

(1) As described above, the vacuum pump of the present invention includes an inverter 43 that has a plurality of switching elements SW1 to SW6 controlled to be on/off based on a PWM driving command and supplies a driving current generated by turning on/off the plurality of switching elements SW1 to SW6 to a motor M or regenerates the driving current from the motor M, a rotational speed/magnetic pole position estimating section 407 for detecting a signal including information about the counter electromotive voltage of the motor M so as to estimate a magnetic pole electric angle and a rotational speed of the motor M, and a measuring zone signal generating section 408 for repeating generation and cut-off of the driving current supplied from a power supply to the motor M via the inverter 43 or on the contrary regenerated from the motor M to the power supply in a low-speed period between a stop state and a predetermined rotational speed ($+\omega 1$) in an accelerating operation at a motor starting time or an decelerating operation at a stopping time. In the region where a counter electromotive voltage is faint, since a signal at a cut-off time at which a voltage from the inverter 43 is not applied is detected, a counter electromotive voltage signal can be accurately detected. As a result, estimating accuracy of the magnetic pole electric angle and the rotational speed to be estimated based on the counter electromotive voltage can be improved. For example, a lower limit value of the rotational speed at which the counter electromotive voltage can be detected by a conventional method is used as the predetermined rotational speed ($+\omega 1$).

(2) As the method for repeating the generation and the cut-off of a driving current, in an open zone (cut-off state) in which all the switching elements SW1 to SW6 of the inverter 43 are off, and a driving state (supply or regenerating state) based on a PWM driving command of a PWM signal generating section 406 may be repeated. In this case, the magnetic pole electric angle and the rotational speed are estimated based on a motor phase voltage detected at time of the open zone.

(3) Further, as another method for generating the cut-off state, a short-circuit control for making electric potentials on respective phases of the motor M uniform may be used. That is to say, as shown in FIG. 10, PWM voltages to be applied to three phases have the same duty and are in a state where the H state and L state synchronize (the short-circuited zone), so that the supply or regeneration of the driving current from the inverter 43 is cut off, and motor power three lines can be short-circuited. In this case, the magnetic pole electric angle and the rotational speed are estimated based on a motor phase current detected at the time of the short-circuited zone.

(4) A cut-off period T2 is set to be longer than a PWM cycle Tpwm, and the cut-off is repeated at a repetition cycle T1 shorter than a rotation cycle in the cut-off period. With such a setting, a plurality of detection points at one cycle of the rotation cycle can be provided, and the estimating accuracy of the magnetic pole electric angle and the rotational speed can be heightened.

(5) When the rotational speed is lower than the predetermined rotational speed, and a predetermined positive reverse rotational speed range (−ω0≤ωs≤+ω0) with respect to the rotational speed of zero is preset, and the rotational speed to be estimated is within the positive reverse rotational speed range, a constant rotational speed value ω2 is output instead of the estimated rotational speed, and the magnetic pole electric angle is generated by using the rotational speed value. A forcible rotation is carried out by using the constant rotational speed value ω2, so that the rotational speed can be quickly shifted to the outside of the positive reverse rotational speed range.

(6) Further, in the case of the vacuum pump having a magnetic bearing device, the motor driving is stopped in the positive reverse rotational speed range, and the motor may be forcibly driven to be rotated to the positive rotational direction by using the magnetic bearing device. In this case, the pump rotor is allowed to revolve in a direction opposite to the motor positive rotational direction by an attraction force of the radial magnetic bearing, and is allowed to rotate in the motor positive rotational direction.

(7) Further, the repetition cycle T1 and the cut-off period T2 in the region (−ω1<ω<+ω1) are switched at the plurality of stages so as to be shorter as the rotational speed of the motor M increases. As a result, even when the rotational cycle is shortened due to the rise in the rotational speed, sufficient detection points can be secured in one cycle of the rotation cycle.

(8) Further, an amplification gain for amplifying a signal including the detected counter electromotive voltage information is switched at a plurality of stages so as to be larger as the rotational speed is lower in a low-speed rotation region (−ω1<<+ω1). As a result, the counter electromotive voltage can be accurately detected even in the superlow speed rotation.

(9) Further, when the amplification gain is switched, and the repetition cycle T1 and the cut-off period T2 are switched, it is preferable that both the switching stages are made to be the same as each other, and a rotational speed at the amplification switching time is made to be equal to rotational speeds at the time of switching between the repetition cycle T1 and the cut-off period T2. Since an influence of transient response is exerted on the signal detection at the switching time, it is desirable that the switching frequency is repressed by the above control.

In the above embodiments, the accelerating operation between the stop state at the motor starting time and the predetermined rotational speed ω1 has been described, but the present invention can be applied also to the decelerating operation between the predetermined rotational speed ω1 at the time of the motor stopping operation and the stopped state. The motor current detection and the motor voltage detection in the case of the three phase inputs are described but only two phase inputs are used and one phase input may be calculated based on the other two phase inputs. For example, when a W phase is calculated, the calculation is made as Iw=−Iu−Iv and Vw=−Vu−Vv.

Further, the operation of a vector phase angle in the phase angle arithmetic section 4076 and a phase angle arithmetic section 4111 in FIG. 6 uses inverse tangent operation, but approximate calculation may be made by another operation.

The above description is only one example, and thus the present invention is not limited to the above embodiments as long as the characteristics of the present invention are not impaired For example, the present invention can be applied not only to the case of a two-pole motor but also to a multi-pole motor such as a four-pole motor by making the electric angle correspond to the multi-pole. Further, in the above embodiments, a turbo molecular pump having a turbo pump stage and a drag pump stage has been described as an example, but the present invention can be similarly applied to any vacuum pump in which a rotor is driven to be rotated by a motor. Further, the present invention can be applied also to a turbo-molecular pump to be supported by a ball bearing.

In the above embodiments, in the control of ωs≥ω1, the rotational speed ωs and the magnetic pole electric angle θs are estimated based on a phase voltage detected by a voltage detecting section 51 and a phase current detected by a current detecting section 50, but the present invention can be applied also to a case where the rotational speed ωs and the magnetic pole electric angle θs are estimated based on one detection information.

The above embodiments may be used individually or may be combined with each other. This is because the embodiments can produce the effects, respectively, or produce a synergy effect.

What is claimed is:
1. A vacuum pump comprising:
a motor for driving to rotate a pump rotor;
a sine wave driving command generating section for generating a sine wave driving command;
a PWM driving command generating section for generating a PWM driving command based on the sine wave driving command;
an inverter circuit, having a plurality of switching elements controlled to be on/off based on the PWM driving command, for supplying, to the motor, a driving current to be generated by turning on/off the plurality of switching elements or regenerating the driving current from the motor;
an estimating section for detecting motor phase voltage of the motor, and estimating a magnetic pole electric angle and a rotational speed of the motor; and
a driving current controller for repeating generation and cut-off of the driving current supplied from a power supply to the motor via the inverter circuit or regenerated from the motor to the power supply in a low-speed period between a stopped state and a predetermined rotational speed in an accelerating operation at a motor starting time or a decelerating operation at a motor stopping time, wherein
the estimating section detects the motor phase voltage at the cut-off time so as to estimate the magnetic pole electric angle and the rotational speed in the low-speed period based on the motor phase voltage,
the driving current controller repeats the supply or the regeneration of the driving current based on an on/off command of the PWM driving command, and the cut-off of the driving current by making all the plurality of switching elements be in an off state in the low-speed period, and
the estimating section detects the motor phase voltage at the cut-off time in the low-speed period, and estimates the magnetic pole electric angle and the rotational speed.

2. The vacuum pump according to claim 1, wherein
a period of the cut-off is longer than a PWM cycle, and the cut-off is repeated in a repetition cycle shorter than a rotation cycle.

3. The vacuum pump according to claim 1, wherein
the rotational speed is lower than the predetermined rotational speed, and a predetermined positive reverse rotational speed range with respect to the rotational speed of zero is preset, and
when the rotational speed to be estimated by the estimating section is within the positive reverse rotational speed range, the estimating section outputs a constant rotational speed value instead of the estimated rotational speed and generates the magnetic pole electric angle using the rotational speed value.

4. The vacuum pump according to claim 1, further comprising:
a radial magnetic bearing and an axial magnetic bearing for magnetically levitating and supporting the pump rotor; and
a magnetic bearing controller for controlling the radial magnetic bearing and the axial magnetic bearing, wherein
when the rotational speed at the motor starting time is within a positive reverse rotational speed range,
the motor driving by the inverter circuit is stopped,
the magnetic bearing controller revolves the pump rotor in a reverse direction to a motor positive rotational direction by an attraction force of the radial magnetic bearing, and rotates the pump rotor in the motor positive rotational direction.

5. The vacuum pump according to claim 1, wherein
the repetition cycle and the cut-off period in the low-speed period are switched at a plurality of stages so as to be shorter as the motor rotational speed is higher.

6. The vacuum pump according to claim 1 further comprising:
an amplifying section for amplifying the detected motor phase voltage or motor phase current and switching an amplification gain at a plurality of stages; and
a gain switching section for switching the amplification gain of the amplifying section so as to be larger as the rotational speed is lower in the low-speed period.

7. A vacuum pump comprising:
a motor for driving to rotate a pump rotor;
a sine wave driving command generating section for generating a sine wave driving command;
a PWM driving command generating section for generating a PWM driving command based on the sine wave driving command;
an inverter circuit, having a plurality of switching elements controlled to be on/off based on the PWM driving command, for supplying, to the motor, a driving current to be generated by turning on/off the plurality of switching elements or regenerating the driving current from the motor;
an estimating section for detecting motor phase current of the motor, and estimating a magnetic pole electric angle and a rotational speed of the motor; and
a driving current controller for repeating generation and cut-off of the driving current supplied from a power supply to the motor via the inverter circuit or regenerated from the motor to the power supply in a low-speed period between a stopped state and a predetermined rotational speed in an accelerating operation at a motor starting time or a decelerating operation at a motor stopping time, wherein
the estimating section detects the motor phase current at the cut-off time so as to estimate the magnetic pole electric angle and the rotational speed in the low-speed period based on the motor phase current,
the driving current controller repeats the supply or the regeneration of the driving current based on an on/off command of the PWM driving command, and the cut-off of the driving current by short-circuit control such that electric potentials of the phases of the motor are uniform in the low-speed period, and
the estimating section detects the motor phase current at the cut-off time in the low-speed period, and estimates the magnetic pole electric angle and the rotational speed.

8. A vacuum pump comprising:
a motor for driving to rotate a pump rotor;
a sine wave driving command generating section for generating a sine wave driving command;
a PWM driving command generating section for generating a PWM driving command based on the sine wave driving command;
an inverter circuit, having a plurality of switching elements controlled to be on/off based on the PWM driving command, for supplying, to the motor, a driving current to be generated by turning on/off the plurality of switching elements or regenerating the driving current from the motor;
an estimating section for detecting motor phase voltage of the motor, and estimating a magnetic pole electric angle and a rotational speed of the motor; and
a driving current controller for repeating generation and cut-off of the driving current supplied from a power supply to the motor via the inverter circuit or regenerated from the motor to the power supply in a low-speed period between a stopped state and a predetermined rotational speed in an accelerating operation at a motor starting time or a decelerating operation at a motor stopping time, wherein
the estimating section detects the motor phase voltage at the cut-off time so as to estimate the magnetic pole electric angle and the rotational speed in the low-speed period based on the motor phase voltage, and
the repetition cycle and the cut-off period in the low-speed period are switched at a plurality of stages so as to be shorter as the motor rotational speed is higher, and
further comprising:
an amplifying section for amplifying the detected motor phase voltage or motor phase current, and switching an amplification gain at a plurality of stages; and
a gain switching section for switching the amplification gain of the amplifying section so as to be larger as the rotational speed is lower in the low-speed period, wherein
the number of switching stages of the amplification gain is equal to the number of switching stages of the repetition cycle and the cut-off period, and the rotational speed at the amplification gain switching time is equal to the rotational speed at the time of switching the repetition cycle and the cut-off period.

* * * * *